(12) United States Patent
Yoshida et al.

(10) Patent No.: US 8,451,302 B2
(45) Date of Patent: May 28, 2013

(54) MULTI PRIMARY COLOR DISPLAY DEVICE

(75) Inventors: Yuichi Yoshida, Osaka (JP); Kazunari Tomizawa, Osaka (JP); Akiko Miyazaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 827 days.

(21) Appl. No.: 12/524,439

(22) PCT Filed: Jan. 21, 2008

(86) PCT No.: PCT/JP2008/050715
§ 371 (c)(1),
(2), (4) Date: Jul. 24, 2009

(87) PCT Pub. No.: WO2008/090845
PCT Pub. Date: Jul. 31, 2008

(65) Prior Publication Data
US 2009/0322662 A1    Dec. 31, 2009

(30) Foreign Application Priority Data
Jan. 25, 2007    (JP) ................... 2007-015281

(51) Int. Cl.
*G09G 5/02*    (2006.01)
(52) U.S. Cl.
USPC ........................... 345/694; 345/88
(58) Field of Classification Search
USPC .............. 345/87, 88, 204, 690, 694, 696
See application file for complete search history.

(56) References Cited

U.S. PATENT DOCUMENTS

| | | | |
|---|---|---|---|
| 4,800,375 A | 1/1989 | Silverstein et al. | |
| 6,570,584 B1 * | 5/2003 | Cok et al. | 345/690 |
| 7,483,095 B2 * | 1/2009 | Roth et al. | 349/106 |
| 7,710,388 B2 * | 5/2010 | Hirata et al. | 345/103 |
| 7,868,862 B2 * | 1/2011 | Lee et al. | 345/88 |
| 7,876,339 B2 | 1/2011 | Okazaki et al. | |
| 2003/0227429 A1 | 12/2003 | Shimoshikiryo | |
| 2004/0001167 A1 | 1/2004 | Takeuchi et al. | |
| 2004/0174389 A1 * | 9/2004 | Ben-David et al. | 345/694 |

(Continued)

FOREIGN PATENT DOCUMENTS

| | | |
|---|---|---|
| EP | 1 705 635 A2 | 9/2006 |
| JP | 09-251160 A | 9/1997 |

(Continued)

OTHER PUBLICATIONS

English translation of Official Communication issued in corresponding International Application No. PCT/JP2008/050715, mailed on Aug. 6, 2009.

(Continued)

*Primary Examiner* — Tom Sheng
(74) *Attorney, Agent, or Firm* — Keating & Bennett, LLP

(57) ABSTRACT

A multi-primary-color display device includes a number of pixels, each of which includes a first subset including red, green and cyan subpixels and a second subset including blue and yellow subpixels. In each pixel, the subpixels included in the first subset are arranged in series in one direction, while the subpixels included in the second subset are arranged in series in the same direction as the subpixels of the first subset.

13 Claims, 8 Drawing Sheets

U.S. PATENT DOCUMENTS

| | | | |
|---|---|---|---|
| 2004/0201561 A1 | 10/2004 | Funamoto et al. | |
| 2005/0122294 A1 | 6/2005 | Ben-David et al. | |
| 2005/0168423 A1* | 8/2005 | Hirata et al. | 345/88 |
| 2005/0264587 A1 | 12/2005 | Kurumisawa | |
| 2005/0270444 A1* | 12/2005 | Miller et al. | 349/108 |
| 2006/0098033 A1* | 5/2006 | Langendijk | 345/694 |
| 2007/0063946 A1* | 3/2007 | Nakamura et al. | 345/88 |
| 2007/0268208 A1 | 11/2007 | Okada et al. | |
| 2009/0273607 A1* | 11/2009 | Ueki et al. | 345/590 |
| 2010/0066956 A1* | 3/2010 | Nakamura et al. | 349/108 |

FOREIGN PATENT DOCUMENTS

| | | |
|---|---|---|
| JP | 10-307205 A | 11/1998 |
| JP | 2001-209047 A | 8/2001 |
| JP | 2001-306023 A | 11/2001 |
| WO | 2005/122122 A1 | 12/2005 |
| WO | 2006/019025 A1 | 2/2006 |

OTHER PUBLICATIONS

Official Communication issued in corresponding European Patent Application No. 08703565.5, mailed on Feb. 11, 2010.

Official Communication issued in International Patent Application No. PCT/JP2008/050715, mailed on Apr. 22, 2008.

Yang et al.: "31.1: Development of Six Primary-Color LCD"; Society for Information Display 2005 International Symposium Digest of Technical Papers; vol. 36, Book 2; May 25-27, 2005; pp. 1210-1213.

Chino et al.: "25.1: Invited Paper: Development of Wide-Color-Gamut Mobile Displays With Four-Primary-Color LCDS"; Society for Information Display 2006 International Symposium Digest of Technical Papers; vol. 37, Book 2; Jun. 7-9, 2006; pp. 1221-1224.

Ben-Chorin: "Improving LCD TV Color Using Multi-Primary Technology"; FPD International 2005 Forum; Oct. 19, 2005; 53 pages.

* cited by examiner

VIDEO SIGNAL

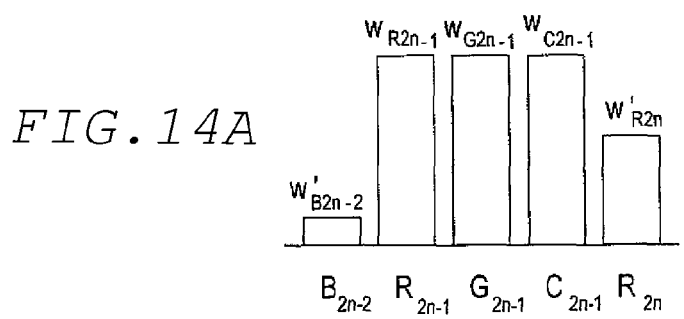
FIG. 14A
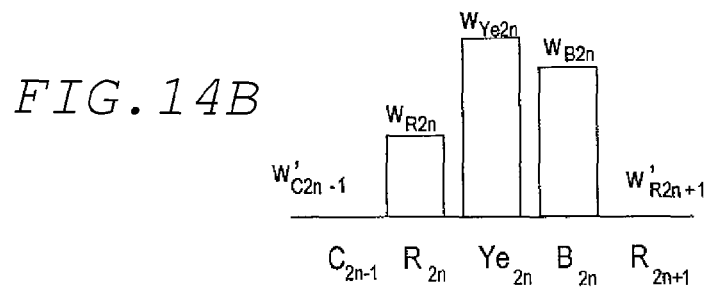
FIG. 14B
FIG. 15
Prior Art
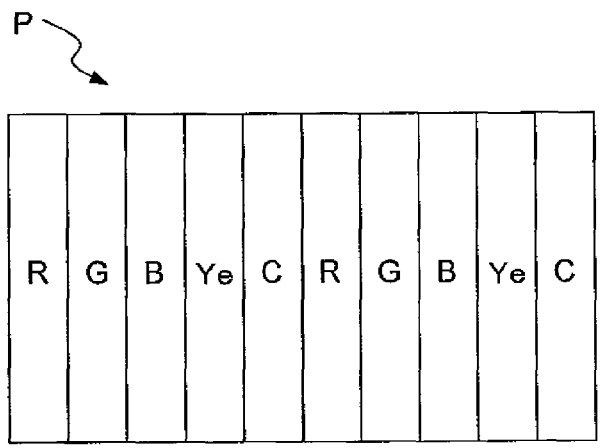
FIG. 16
Prior Art
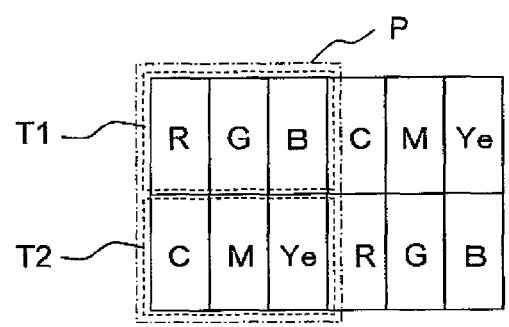

US 8,451,302 B2

MULTI PRIMARY COLOR DISPLAY DEVICE

BACKGROUND OF THE INVENTION

1. Field of the Invention

The present invention relates to a multi-primary-color display device.

2. Description of the Related Art

A color display device such as a color TV monitor or a color display monitor represents colors usually by adding together the three primary colors of red (R), green (G) and blue (b). Generally, each pixel in a color display device has red, green and blue subpixels for these three primary colors of RGB. YCrCb (YCC) signals, which can be converted into RGB signals, are input to such a three-primary-color display device and the red, green and blue subpixels change their luminances (or grayscale values) in response to the YCrCb signals, thereby representing various colors.

The luminances of the respective subpixels vary within the range from the one corresponding to their lowest grayscale (e.g., grayscale level 0) through the one corresponding to their highest grayscale (e.g., grayscale level 255). If the grayscales of all of these subpixels, namely, the red, green and blue subpixels, is the lowest grayscale, the color represented by the pixel is black. Conversely, if the grayscales of all of these subpixels is the highest grayscale, the color represented by the pixel is white. Recently, TV sets are more and more often designed to allow the user to control the color temperature. In that case, the color temperature is controlled by finely adjusting the luminance of the respective subpixels. For that reason, the grayscale of the respective subpixels after the color temperature has been controlled to a desired value is the highest grayscale.

Although such three-primary-color display devices have been used generally so far, those display devices cannot represent fully a lot of colors discernible to human beings. To overcome such a problem, multi-primary-color display devices, which perform a display operation using four or more primary colors, have been proposed recently to expand the color reproduction range of display devices.

However, to make a pixel for such a multi-primary-color display device with the same resolution as a three-primary-color display device, a greater number of subpixels should be arranged either vertically or horizontally, thus causing an increase in cost. Meanwhile, if a multi-primary-color display device were fabricated with only the color filters changed and without changing the configurations of subpixels of a current three-primary-color display device, then the resolution would be lower than that of the three-primary-color display device and a display operation could not be performed with sufficiently high definition. In view of this consideration, a technique for increasing the resolution of a multi-primary-color display device in monochrome display mode has been proposed (see PCT International Application Japanese National Phase Publication No. 2005-523465, for example).

PCT International Application Japanese National Phase Publication No. 2005-523465 discloses a multi-primary-color display device including subpixels R, G, B, Ye and C in five primary colors that are arranged one-dimensionally as shown in FIG. 15. In such a multi-primary-color display device, each set of three subpixels that are adjacent to each other in the row direction, i.e., RGB, GBYe, BYeC, YeCR and CRG, can produce light that is as close to white light as possible, thus attempting to increase the resolution.

PCT International Application Japanese National Phase Publication No. 2005-523465 also discloses a multi-primary-color display device including subpixels R, G, B, C, M and Ye in six primary colors that are arranged two-dimensionally as shown in FIG. 16. In such a multi-primary-color display device, each pixel P has not only a subset T1 of three subpixels R, G and B representing the three primary colors of light in the row direction but also another subset T2 of three subpixels C, M and Ye representing the three primary colors of colors, which are arranged parallel to the subset T1. And each of these subsets T1 and T2 produces substantially white light. Also, in this arrangement, there are three pairs of subpixels RC, GM and BYe that are arranged in the row direction. Since the two colors of each of these combinations are complementary ones, substantially white light is also produced by each of these pairs of subpixels. In this manner, the multi-primary-color display device with the arrangement of subpixels shown in FIG. 16 tries to increase the resolution substantially threefold horizontally and substantially twofold vertically.

In the multi-primary-color display devices with the arrangements of subpixels shown in FIGS. 15 and 16, the subpixels are arranged such that the colors represented by the respective groups of adjacent subpixels have substantially the same chromaticity values. However, those colors represented by the respective groups of subpixels have mutually different luminances. That is to say, the luminances vary from one group of subpixels to another, and therefore, the resolution of the multi-primary-color display device cannot be increased substantively after all. Also, in representing an achromatic color such as white, if the upper limit of the luminance range adopted by a group of subpixels with a relatively high maximum luminance were set equal to a relatively low maximum luminance of another group of subpixels, then the variation in luminance between the groups of subpixels could be minimized. In that case, however, an achromatic color with a high luminance could not be represented.

SUMMARY OF THE INVENTION

Accordingly, preferred embodiments of the present invention provide a multi-primary-color display device that can represent an achromatic color with a high luminance at a substantially high resolution.

A multi-primary-color display device according to a preferred embodiment of the present invention has a number of pixels. Each of the pixels has a first subset including red, green and cyan subpixels and a second subset including yellow and blue subpixels. In each pixel, the subpixels included in the first subset are arranged in series in one direction, while the subpixels included in the second subset are arranged in series in the same direction as the subpixels of the first subset.

In one preferred embodiment, in each pixel, the subpixels of first and second subsets are arranged in line.

In one preferred embodiment, supposing achromatic colors to be represented by the first and second subsets are called a "first achromatic color" and a "second achromatic color", respectively, the ratio of the difference in luminance between the first and second achromatic colors to the sum of the maximum luminances of the first and second achromatic colors is equal to or smaller than about 15% and the difference $\Delta$ u'v' in chromaticity between the first and second achromatic colors is equal to or smaller than about 0.100, for example.

In one preferred embodiment, the subpixels of the respective pixels are arranged in matrix. Supposing an achromatic color to be represented by not only one of the first and second subsets but also subpixels that are adjacent to the one subset is called a "first achromatic color" and an achromatic color to be represented by the other subset is called a "second achromatic color", the ratio of the difference in luminance between the first and second achromatic colors to the sum of the maximum luminances of the first and second achromatic colors is equal to or smaller than about 15% and the difference $\Delta u'v'$ in chromaticity between the first and second achromatic colors is equal to or smaller than about 0.100, for example.

In one preferred embodiment, the subpixels of the respective pixels are arranged in matrix. Supposing an achromatic color to be represented by not only one of the first and second subsets but also subpixels that are adjacent to the one subset is called a "first achromatic color" and an achromatic color to be represented by not only the other subset but also subpixels that are adjacent to the other subset is called a "second achromatic color", the ratio of the difference in luminance between the first and second achromatic colors to the sum of the maximum luminances of the first and second achromatic colors is equal to or smaller than about 15% and the difference $\Delta u'v'$ in chromaticity between the first and second achromatic colors is equal to or smaller than about 0.100, for example.

In one preferred embodiment, in the first subset, the green subpixel is located between the red and cyan subpixels.

In one preferred embodiment, the subpixels of the first and second subsets are arranged in line in the order of the red, green, cyan, yellow and blue subpixels.

In one preferred embodiment, the second subset further includes another red subpixel that is different from the red subpixel of the first subset.

In one preferred embodiment, in each pixel, each of the subpixels included in the first subset is arranged adjacent to its associated one of the subpixels included in the second subset.

In one preferred embodiment, the another red subpixel of the second subset is adjacent to the red subpixel of the first subset.

In one preferred embodiment, in each pixel, the subpixels included in the first subset are arranged in the order of the red, green and cyan subpixels, and the subpixels included in the second subset are arranged in the order of the another red, yellow and blue subpixels.

In one preferred embodiment, the subpixels of at least one of the first and second subsets have luminances determined based on the value of a video signal representing the colors of two pixels.

In one preferred embodiment, when the pixel represents an achromatic color, the upper limit of the luminance of at least one of the subpixels included in the first and second subsets is defined to be lower than a luminance corresponding to the highest grayscale.

In one preferred embodiment, the multi-primary-color display device includes a multi-primary-color display panel including the pixels described above, and a multi-primary-color converter arranged to convert the values of a video signal representing the luminances of red, green and blue into values representing the luminances of the primary colors of the subpixels included in the first and second subsets.

Various preferred embodiments of the present invention provide a multi-primary-color display device that can represent an achromatic color with a high luminance at a substantially high resolution.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 10A and 10B illustrate a multi-primary-color display device as a fifth preferred embodiment of the present invention, wherein FIG. 10A is a schematic representation illustrating subpixels on a single row of the multi-primary-color display device of the fifth preferred embodiment, while FIG. 10B is a schematic representation showing the values obtained by subjecting the value of a video signal to a multi-primary-color conversion.

FIGS. 14A and 14B show the luminances of respective subpixels to represent achromatic colors in the multi-primary-color display device of the sixth preferred embodiment, wherein FIG. 14A is a schematic representation showing the luminances of respective subpixels to represent a first achromatic color and FIG. 14B is a schematic representation showing the luminances of respective subpixels to represent a second achromatic color.

FIG. 15 is a schematic representation illustrating the arrangement of subpixels in a conventional multi-primary-color display device.

FIG. 16 is a schematic representation illustrating the arrangement of subpixels in another conventional multi-primary-color display device.

DETAILED DESCRIPTION OF THE PREFERRED EMBODIMENTS

Hereinafter, preferred embodiments of a multi-primary-color display device according to the present invention will be described with reference to the accompanying drawings.

Preferred Embodiment 1

Hereinafter, a first preferred embodiment of a multi-primary-color display device according to the present invention will be described.

Figure 1:
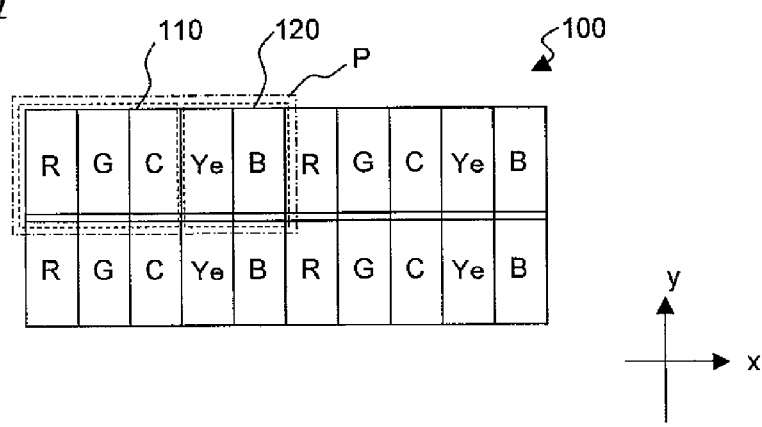
FIG. 1 is a schematic representation illustrating the arrangement of subpixels in a multi-primary-color display device as a first preferred embodiment of the present invention.

FIG. 1 is a schematic representation illustrating a multi-primary-color display device 100 as a first preferred embodiment of the present invention. Specifically, FIG. 1 illustrates four pixels P thereof, each having a subset 110 including red, green and cyan subpixels R, G and C and a subset 120 including yellow and blue subpixels Ye and B. In each pixel P, the red, green and cyan subpixels R, G and C included in the first subset 110 are arranged in series in the row direction (x direction), while the yellow and blue subpixels Ye and B included in the second subset 120 are also arranged in series in line with the subpixels included in the first subset 110. That is to say, the red, green and cyan subpixels R, G and C of the subset 110 are arranged in one half of the pixel P, while the yellow and blue subpixels Ye and B of the subset 120 are arranged in the other half of the pixel P. And the subpixels of the pixel P are arranged in the order of red, green, cyan, yellow and blue subpixels. In this description, the subsets 110 and 120 will also be referred to herein as "first subset" and "second subset", respectively. In this preferred embodiment, the multi-primary-color display device 100 is implemented as a liquid crystal display device.

In the multi-primary-color display device 100 of this preferred embodiment, the first subset 110 includes red, green and cyan subpixels, while the second subset 120 includes yellow and blue subpixels. As can be seen, the arrangement of the subpixels in this multi-primary-color display device 100 is obtained by interchanging the cyan and blue subpixels with each other in the conventional multi-primary-color display device shown in FIG. 15.

These five types of subpixels, namely, the red, green, blue, yellow and cyan subpixels R, G, B, Ye and C, are formed preferably by defining a matrix of subpixel regions on a color filter layer (not shown) and providing color filters for the respective subpixel regions. Also, each of those subpixels is defined by a subpixel electrode (not shown, either), which is arranged so as to face a counter electrode (not shown, either) with a liquid crystal layer (not shown, either) interposed between them. Although not shown in FIG. 1, each column of subpixels is connected to the same signal line and each row of subpixels is connected to the same scan line. When a scan line is selected, a display signal voltage to be supplied to a signal line is applied to its associated subpixel electrode, thereby controlling the luminance of the subpixel.

The following Table 1 summarizes the chromaticity values x and y and the luminance values Y (%) of the respective subpixels in the multi-primary-color display device 100 of this preferred embodiment. The chromaticity values x and y and the luminance value Y of each subpixel are the chromaticity x and y and luminance Y of a color that will be displayed when the grayscale of only that subpixel is increased to its maximum value (e.g., the $255^{th}$ grayscale). Also, after each luminance value Y, shown in parentheses is the ratio of the luminance Y of each subpixel to the maximum luminance of its associated pixel P. It should be noted that the luminance Y could be expressed in any arbitrary unit.

TABLE 1

|  | x | y | Y (%) |
| --- | --- | --- | --- |
| R | 0.6600 | 0.3235 | 1.02 (9.3) |
| G | 0.2578 | 0.6622 | 2.53 (22.9) |
| B | 0.1469 | 0.0537 | 0.52 (4.6) |
| Ye | 0.4704 | 0.5198 | 5.31 (48.2) |
| C | 0.1567 | 0.2703 | 1.68 (15.2) |

In Table 1, the chromaticity values x and y were rounded off to four decimal places, the luminance values Y were rounded off to two decimal places, and the luminance (Y) ratios were rounded off to one decimal place.

Hereinafter, the advantages of the multi-primary-color display device 100 of this preferred embodiment over a multi-primary-color display device as Comparative Example 1 will be described. First of all, the multi-primary-color display device as Comparative Example 1 will be described. In each pixel of the multi-primary-color display device of Comparative Example 1, the subpixels are arranged as shown in FIG. 15. The multi-primary-color display device of Comparative Example 1 has subpixels, of which the chromaticity and luminance values are the same as those of the multi-primary-color display device 100 show in Table 1, but is different from the multi-primary-color display device 100 in that the cyan subpixel in the first subset and the blue subpixel in the second subset are interchanged with each other. That is to say, each pixel of the multi-primary-color display device as Comparative Example 1 has a subset including R, G and B subpixels representing the three primary colors of light and a subset including Ye and C subpixels representing two of the three primary colors of colors. In the following description, in the multi-primary-color display device of Comparative Example 1, the subset including the R, G and B subpixels will be referred to herein as a "first subset" while the subset including the Ye and C subpixels will be referred to herein as a "second subset".

The following Table 2 summarizes the maximum luminance Ys (%) in each subset of the multi-primary-color display device of Comparative Example 1 in a situation where each subpixel has its highest grayscale (e.g., the $255^{th}$ grayscale), the maximum luminance Yp of each pixel thereof, the difference $\Delta$Ys (%) between the maximum luminances of the two subsets (or difference in luminance between the subsets), the chromaticity coordinates (x, y) and color temperatures of the subsets, and the difference $\Delta$u'v' in chromaticity between the subsets. In this case, the maximum luminance Ys is expressed as the ratio of the maximum luminance of each subset to that of its associated pixel. Also, the $\Delta$Ys ratio is calculated by $\Delta Ys=|Y1-Y2|/(Y1+Y2)\times100(\%)$, where Y1 and Y2 are the respective luminances of the first and second subsets in a situation where every subpixel has the maximum grayscale. It should be noted that each pixel of the multi-primary-color display device of Comparative Example 1 has subpixels with the same chromaticity and luminance values as those of the multi-primary-color display device 100 of this preferred embodiment. Therefore, the maximum luminance Yp and color temperature of each pixel of the multi-primary-color display device as Comparative Example 1 are the same as those of the multi-primary-color display device 100 of this preferred embodiment.

TABLE 2

| | Comparative Example 1 | |
|---|---|---|
| | Subset | |
| | RGB | YeC |
| Maximum luminance Ys (%) of subset | 4.07 (36.8) | 6.99 (63.2) |
| Maximum luminance Yp of pixel | 11.05 | |
| Luminance difference $\varDelta$ Ys (%) between subsets | 2.92 (26.4) | |
| Chromaticity coordinates (x, y) | (0.2708, 0.2458) | (0.3520, 0.4256) |
| Color temperature (K) | 16710 | 4968 |
| Chromaticity difference $\varDelta$ u'v' | 0.109 | |

TABLE 3

| | Comparative Example 1 Subset | | This embodiment | |
|---|---|---|---|---|
| | RGB | YeC | RGC | YeB |
| Maximum luminance Ys (%) of subset | 4.07 (36.8) | 6.99 (63.2) | 5.23 (47.3) | 5.82 (52.7) |
| Maximum luminance Yp of pixel | 11.05 | | 11.05 | |
| Luminance difference $\varDelta$ Ys (%) between subsets | 2.92 (26.4) | | 0.59 (5.4) | |
| Chromaticity coordinates (x, y) | (0.2708, 0.2458) | (0.3520, 0.4256) | (0.3070, 0.3966) | (0.3141, 0.2946) |
| Color temperature (K) | 16710 | 4968 | 6381 | 6743 |
| Chromaticity difference $\varDelta$ u'v' | 0.109 | | 0.065 | |

As shown in Table 2, in the multi-primary-color display device of Comparative Example 1, the first subset has chromaticity coordinates (0.2708, 0.2458) and a color temperature of 16710 K, while the second subset has chromaticity coordinates (0.3520, 0.4256) and a color temperature of 4968 K.

As also shown in Table 2, in the multi-primary-color display device of Comparative Example 1, the ratio of the difference $\varDelta$ Ys in luminance between the subsets is 26.4% and the chromaticity difference is 0.109. Generally speaking, if the ratio of the difference $\varDelta$ Ys in luminance between two subsets is greater than about 15% and if the chromaticity difference thereof is greater than about 0.100, then those two subsets would appear to represent mutually different colors. In the multi-primary-color display device of Comparative Example 1, the ratio of the luminance difference $\varDelta$ Ys and the chromaticity difference both exceed those values. That is why if the respective subpixels had their highest grayscales to make the pixel represent the color white, then mutually different colors would be perceived from one subset to another, and therefore, the display operation could not be conducted with substantially high resolution.

Also, if in the second subset (YeC) with the higher maximum luminance Ys, the luminances are not used up to its maximum value of 6.99 but have their upper limit defined to be 4.07, which is equal to the maximum luminance of the first subset (RGB), then a display operation can be conducted with the luminances of the two subsets matched to each other. In that case, however, when an achromatic color is displayed, the luminance of a pixel has too low an upper limit of 9.14 (=4.07×2) to allow the pixel to represent the achromatic color with high luminance.

Next, the multi-primary-color display device 100 of this preferred embodiment will be described. The following Table 3 also summarizes the maximum luminance Ys (%) in each subset in a situation where each subpixel of the multi-primary-color display device 100 has its highest grayscale (e.g., the 255$^{th}$ grayscale), the maximum luminance Yp of each pixel thereof, the difference $\varDelta$ Ys (%) between the luminances of the two subsets, the chromaticity coordinates (x, y) and color temperatures of the subsets, and the difference $\varDelta$ u'v' in chromaticity between the subsets. In Table 3, the values of the multi-primary-color display device of Comparative Example 1 shown in Table 2 are also shown for reference.

In the multi-primary-color display device 100, the first subset 110 has chromaticity coordinates (0.3070, 0.3966) and a color temperature of 6381 K, while the second subset 120 has chromaticity coordinates (0.3141, 0.2946) and a color temperature of 6743 K.

As also shown in Table 3, in the multi-primary-color display device of Comparative Example 1, the ratio of the difference $\varDelta$ Ys in luminance between the subsets is 26.4% and the chromaticity difference $\varDelta$ u'v' is 0.109. In the multi-primary-color display device 100 of this preferred embodiment, on the other hand, the ratio of the difference $\varDelta$ Ys in luminance between the subsets is 5.4% and the chromaticity difference $\varDelta$ u'v' is 0.065. Also, in the multi-primary-color display device 100 of this preferred embodiment, the color temperatures of the subsets are closer to the reference value of 6500 K than in the multi-primary-color display device of Comparative Example 1. That is why comparing the multi-primary-color display device 100 to the counterpart of Comparative Example 1, it can be seen that the ratio of the luminance difference $\varDelta$ Ys and the chromaticity difference $\varDelta$ u'v' of this multi-primary-color display device 100 are smaller than those of the multi-primary-color display device of Comparative Example 1.

In the multi-primary-color display device of Comparative Example 1, the first subset includes subpixels representing only the three primary colors of light and having low luminances Y (or transmittances), while the second subset includes subpixels representing only two of the three primary colors of colors and having high luminances Y. On the other hand, in the multi-primary-color display device 100 of this preferred embodiment, each of the first and second subsets 110 and 120 includes subpixels, at least one of which represents at least one of the three primary colors of light and at least another one of which represents one of the three primary colors of colors. In addition, in the multi-primary-color display device 100 of this preferred embodiment, the second subset 120 includes a blue subpixel with a relatively low luminance Y among the three subpixels representing the three primary colors of light and a yellow subpixel with the higher luminance Y in the subpixels representing two of the three primary colors of colors, and therefore, the difference in luminance $\varDelta$ Ys between the subsets has decreased. Furthermore, the maximum luminance of each single pixel is the same between the multi-primary-color display device 100 of this preferred embodiment and its counterpart of Comparative Example 1. That is why the smaller the difference $\Delta$ Ys in luminance between the subsets, the smaller the ratio of the luminance difference $\Delta$Ys between the subsets. As a result, the Ys ratios representing the maximum luminances of the first and second subsets 110 and 120 become close to about 50%. Consequently, the multi-primary-color display device 100 of this preferred embodiment achieves a smaller ratio of the luminance difference $\Delta$Ys than the multi-primary-color display device of Comparative Example 1.

Compared to a three-primary-color display device, the multi-primary-color display device 100 of this preferred embodiment includes yellow and cyan subpixels Ye and C in addition to the red, green and blue subpixels R, G and B. If the color temperature of each pixel of the multi-primary-color display device is almost equal to that of the three-primary-color display device, then the color green can also be represented by the additional yellow and cyan subpixels Ye and C. That is why in the multi-primary-color display device, the chromaticity of the green subpixel G is closer to that of an achromatic color than in the three-primary-color display device and the luminance of the green subpixel G is lower than in the three-primary-color display device. For that reason, if an achromatic color were represented by a subset including red, green and blue (RGB) subpixels as in the multi-primary-color display device of Comparative Example 1, a color, of which the green component has decreased compared to the chromaticity of an achromatic color represented by all subpixels (i.e., the desired achromatic color), would be displayed. On the other hand, a subset including red, green and cyan (RGC) subpixels, in which the blue subpixel B is replaced with the cyan subpixel C with green component, as adopted in the multi-primary-color display device 100 of this preferred embodiment would be able to represent an achromatic color that is close enough to the desired one. Consequently, the multi-primary-color display device 100 of this preferred embodiment achieves a smaller chromaticity difference $\Delta$u'v' than the counterpart of Comparative Example 1.

Thus, the multi-primary-color display device 100 of this preferred embodiment can reduce the ratio of the luminance difference $\Delta$Ys and the chromaticity difference $\Delta$u'v' between the first and second subsets 110 and 120. Also, to avoid the unwanted situation where the two subsets appear to represent mutually different colors, the ratio of the luminance difference $\Delta$Ys and the chromaticity difference $\Delta$u'v' between the subsets are preferably equal to or smaller than about 15% and about 0.100, respectively. The multi-primary-color display device 100 of this preferred embodiment can certainly reduce the ratio of the luminance difference $\Delta$Ys and the chromaticity difference $\Delta$u'v' between the subsets to about 15% or less and about 0.100 or less, respectively. In this manner, the variations in luminance difference ratio and chromaticity between the subsets when the grayscales of the subpixels are increased to the highest ones to represent the color white can be reduced. As a result, an achromatic color can be represented with substantially high resolution by using each subset as a display unit of the achromatic color. In the following description, "to substantially equalize the luminances Ys of the subsets with each other" means reducing the ratio of the luminance difference $\Delta$Ys between the subsets to about 15% or less and "to substantially equalize the chromaticity values of the subsets with each other" means reducing the chromaticity difference between the subsets to about 0.100 or less.

Furthermore, in the multi-primary-color display device 100, the lower one of the respective maximum luminances Ys of the two subsets is 5.23, which is higher than that of the multi-primary-color display device of Comparative Example 1. That is why even if an achromatic color is represented with the respective luminances of the two subsets equalized with each other, the luminance of the pixel can still have a relatively high upper limit of 10.46 (=5.23×2). As a result, an achromatic color with high luminance can be represented.

As described above, in the multi-primary-color display device 100 of this preferred embodiment, each pixel P has the first subset 110 including red, green and cyan subpixels R, G and C and the second subset 120 including yellow and blue subpixels Ye and B, and therefore, can reduce the ratio of the luminance difference $\Delta$Ys and the chromaticity difference $\Delta$u'v' between the subsets 110 and 120 in representing an achromatic color more easily than the multi-primary-color display device of Comparative Example 1. In addition, the multi-primary-color display device 100 can also conduct a display operation better with the decrease in the maximum luminance of a pixel checked and the variation in luminance between the subsets reduced compared to the multi-primary-color display device of Comparative Example 1. On top of that, the multi-primary-color display device 100 can also be fabricated by the similar process as the conventional one except that the arrangements of color filters defining the colors of the subpixels are changed.

In the foregoing description, the subpixels included in one pixel P are preferably arranged in the order of red, green, cyan, yellow and blue subpixels. However, the present invention is in no way limited to that specific preferred embodiment. As long as the first subset includes red, green and cyan subpixel and the second subset includes yellow and blue subpixels, those subpixels may also be arranged in any other order. Nevertheless, in the red, green and cyan subpixels included in the first subset, it is preferred that the green subpixel with the highest luminance be arranged at the center.

Figure 2:
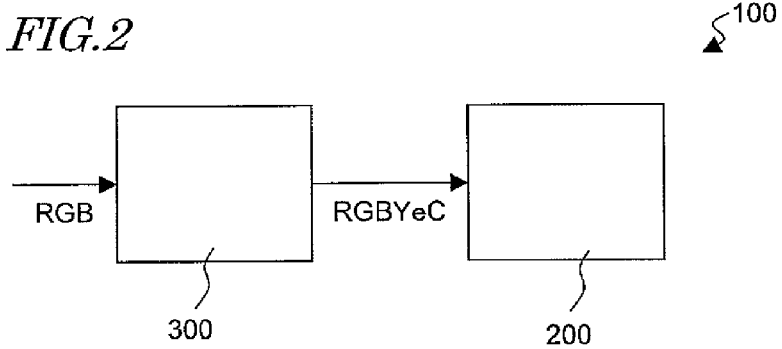
FIG. 2 is a block diagram illustrating the configuration of the multi-primary-color display device of the first preferred embodiment of the present invention.

Optionally, the multi-primary-color display device 100 may also conduct a display operation in multiple primary colors based on a video signal representing the luminance levels of the three primary colors of R, G and B. As shown in FIG. 2, the multi-primary-color display device 100 includes a multi-primary-color display panel 200 including pixels P shown in FIG. 1 and a multi-primary-color converter 300 for determining the luminances of the primary colors represented by the respective subpixels included in each pixel P of the multi-primary-color display panel 200 based on the red, green and blue luminances represented by the video signal. The multi-primary-color converter 300 generates a multi-primary-color signal representing the luminances of the primary colors associated with the respective subpixels. And the respective subpixels of the multi-primary-color display panel 200 have the luminances of the primary colors represented by that multi-primary-color signal. In this preferred embodiment, the multi-primary-color display panel 200 is preferably implemented as an LCD panel.

The red, green and blue subpixels R, G and B preferably have dominant wavelengths of 605 nm to 635 nm, 520 nm to 550 nm, and 470 nm or less, respectively. Meanwhile, the yellow and cyan subpixels Ye and C preferably have dominant wavelengths of 565 nm to 580 nm and 475 nm to 500 nm, respectively.

Preferred Embodiment 2

Hereinafter, a second preferred embodiment of a display device according to the present invention will be described.

Figure 3:
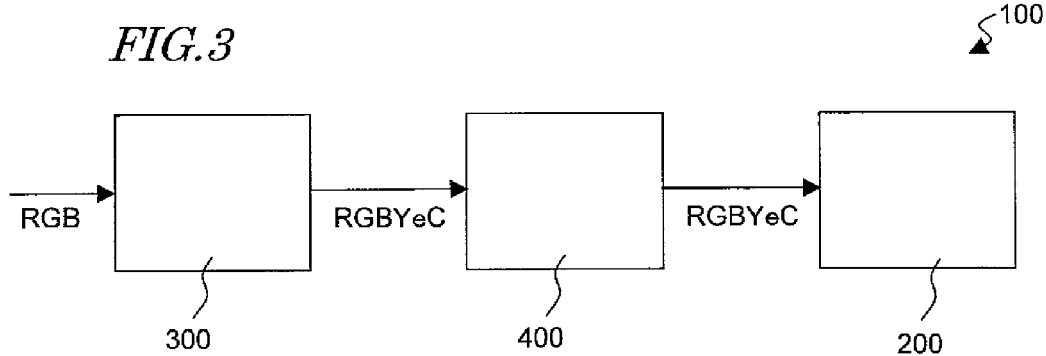
FIG. 3 is a block diagram illustrating a configuration for a multi-primary-color display device as a second preferred embodiment of the present invention.

As shown in FIG. 3, the multi-primary-color display device 100 of this preferred embodiment includes the multi-primarycolor display panel 200, the multi-primary-color converter 300 and an adjusting section 400. That is to say, the multi-primary-color display device 100 of this preferred embodiment has the similar configuration as the counterpart of the first preferred embodiment that has already been described with reference to FIG. 2 except that the device of this preferred embodiment further includes the adjusting section 400. That is why the description of their common features will be omitted herein to avoid redundancies.

In the multi-primary-color display device 100 of this preferred embodiment, when an achromatic color is represented, the adjusting section 400 defines the upper limit of the luminance of the primary color associated with at least one subpixel to be lower than a luminance associated with the highest grayscale, and at least one subpixel of the multi-primary-color display panel 200 has the luminance of the primary color that has been adjusted by the adjusting section 400. More specifically, the adjusting section 400 adjusts the luminance of the subpixel by controlling the grayscale value thereof. As a result, at least one of the ratio of the luminance difference $\varDelta$Ys and the chromaticity difference $\varDelta$u'v' between the subsets can be reduced.

Hereinafter, the advantages of the multi-primary-color display device of this preferred embodiment over a multi-primary-color display device as Comparative Example 2 will be described. First of all, the multi-primary-color display device as Comparative Example 2 will be described. The multi-primary-color display device of Comparative Example 2 has the similar configuration as the counterpart shown in FIG. 3 except that each pixel has the arrangement of subpixels shown in FIG. 15 in the device of Comparative Example 2. That is to say, each pixel of the multi-primary-color display device as Comparative Example 2 has a first subset including red, green and blue subpixels and a second subset including yellow and cyan subpixels. And when an achromatic color is represented, the luminances of the subpixels are adjusted. In the multi-primary-color display device of Comparative Example 2, the luminances of the subpixels are adjusted so as to reduce the ratio of the luminance difference $\varDelta$ Ys and the chromaticity difference $\varDelta$u'v' between the subsets when an achromatic color is represented.

The following Table 4 summarizes the maximum luminance Ys (%) in each subset of the multi-primary-color display device of Comparative Example 2 when an achromatic color is represented, the luminance ratio and the grayscale values of the respective subpixels, the maximum luminance Yp of each pixel thereof, the difference $\varDelta$ Ys (%) in luminance between the subsets, the chromaticity coordinates (x, y), and the difference $\varDelta$u'v' in chromaticity between the subsets. In this case, there are 256 grayscales, the luminance ratio of zero represents a luminance associated a grayscale value of zero, and the luminance ratio of one represents a luminance associated with a grayscale value of 255.

TABLE 4

| Comparative Example 2 | | |
|---|---|---|
| | Subset | |
| | RGB | YeC |
| Maximum luminance Ys (%) of subset | 4.07 (42.0) | 5.61 (58.0) |
| Luminance ratio | (1, 1, 1) | (0.74, 1) |
| Grayscale values | (255, 255, 255) | (233, 255) |
| Maximum luminance Yp of pixel | 9.67 | |

TABLE 4-continued

| Comparative Example 2 | | |
|---|---|---|
| | Subset | |
| | RGB | YeC |
| Luminance difference$\varDelta$ Ys (%) between subsets | 1.54 (15.9) | |
| Chromaticity coordinates (x, y) | (0.2708, 0.2458) | (0.3291, 0.4074) |
| Chromaticity difference $\varDelta$u'v' | 0.100 | |

In the multi-primary-color display device of Comparative Example 2, the first subset has chromaticity coordinates (0.2708, 0.2458), while the second subset has chromaticity coordinates (0.3291, 0.4074). Also, in the multi-primary-color display device of Comparative Example 2, the yellow subpixel of the second subset had its luminance adjusted, while no subpixels of the first subset had their luminances adjusted.

In the multi-primary-color display device of Comparative Example 2, the luminance of the yellow subpixel is adjusted, thereby achieving a smaller ratio of the luminance difference $\varDelta$Ys and a smaller chromaticity difference $\varDelta$u'v' between the subsets than in the multi-primary-color display device of Comparative Example 1. However, in the multi-primary-color display device of Comparative Example 2, the upper limit of the luminance of the yellow subpixel is adjusted to be lower than the luminance associated with the highest grayscale unlike the multi-primary-color display device of Comparative Example 1 in which each subpixel has the highest grayscale. That is why the maximum luminance Ys of each subset is smaller than in the multi-primary-color display device of Comparative Example 1. Comparing the maximum luminance Ys of the multi-primary-color display device of Comparative Example 2 to that of its counterpart of the Comparative Example 1, it can be seen that the luminance ratio is 88% (=9.67/11.05).

Next, the multi-primary-color display device 100 of this preferred embodiment will be described. The following Table 5 also summarizes the maximum luminance Ys (%) in each subset of the multi-primary-color display device 100 of this preferred embodiment when an achromatic color is represented, the luminance ratio and the grayscale values of the respective subpixels, the maximum luminance Yp of each pixel thereof, the difference $\varDelta$ Ys (%) in luminance between the subsets, the chromaticity coordinates (x, y) of the subsets, and the difference $\varDelta$u'v' in chromaticity between the subsets. In the multi-primary-color display device 100 of this preferred embodiment, the adjusting section 400 adjusts the luminance of the subpixels when an achromatic color is represented so as to reduce the ratio of the luminance difference $\varDelta$Ys between the subsets. In Table 5, the values of the multi-primary-color display device of Comparative Example 2 shown in Table 4 are also shown for reference.

TABLE 5

| | Comparative Example 2 | | This embodiment | |
|---|---|---|---|---|
| | Subset | | | |
| | RGB | YeC | RGC | YeB |
| Maximum luminance Ys (%) of subset | 4.07 (42.1) | 5.61 (58.0) | 5.23 (49.7) | 5.29 (50.3) |

TABLE 5-continued

| | Comparative Example 2 Subset | | This embodiment Subset | |
|---|---|---|---|---|
| | RGB | YeC | RGC | YeB |
| Luminance ratio | (1, 1, 1) | (0.74, 1) | (1, 1, 1) | (0.9, 1) |
| Grayscale values | (255, 255, 255) | (233, 255) | (255, 255, 255) | (244, 255) |
| Maximum luminance Yp of pixel | 9.67 | | 10.52 | |
| Luminance difference $\Delta$Ys (%) between subsets | 1.54 (15.9) | | 0.06 (0.60) | |
| Chromaticity coordinates (x, y) | (0.2708, 0.2458) | (0.3291, 0.4074) | (0.3070, 0.3966) | (0.3056, 0.2823) |
| Chromaticity difference $\Delta$u'v' | 0.100 | | 0.072 | |

In the multi-primary-color display device 100 of this preferred embodiment, the first subset 110 has chromaticity coordinates (0.3070, 0.3966), while the second subset 120 has chromaticity coordinates (0.3056, 0.2823). It should be noted that in the multi-primary-color display device of this preferred embodiment, the yellow subpixel in the second subset had its luminance adjusted but no subpixels in the first subset had their luminance adjusted.

In the multi-primary-color display device 100 of this preferred embodiment, even when the luminance of the subpixel is adjusted, the maximum luminance Yp of the pixel is still as high as 10.52, and the ratio of the maximum luminance to that of the multi-primary-color display device of the first preferred embodiment as shown in Table 3 is 95% (=10.52/11.05). As described above, in the multi-primary-color display device of Comparative Example 2, the luminance ratio decreases to 88% by making adjustments on the multi-primary-color display device of Comparative Example 1 with the arrangement of subpixels shown in FIG. 15. On the other hand, even when adjustments are made on the multi-primary-color display device 100 of this preferred embodiment, the luminance ratio is still as high as 95%. That is to say, the decrease in luminance ratio can be minimized. On top of that, the ratio of the luminance difference $\Delta$Ys between the subsets is small even when no adjustments are made on the multi-primary-color display device 100 of this preferred embodiment. That is why just by slightly adjusting the luminance of the yellow subpixel, the ratio of the luminance difference $\Delta$Ys between the subsets can be reduced significantly compared to the multi-primary-color display device of Comparative Example 2.

As described above, in the multi-primary-color display device 100 of this preferred embodiment, the cyan subpixel in the first subset and the blue subpixel in the second subset in the multi-primary-color display device of Comparative Example 2 have been interchanged with each other, and therefore, the difference between the colors represented by the two subsets can be further narrowed just by making a minor adjustment.

Comparing the multi-primary-color display devices of Comparative Example 2 and this preferred embodiment shown in Table 5 to each other, it can be seen that in the multi-primary-color display device 100 of this preferred embodiment, the lower one of the maximum luminances Ys of the two subsets is 5.23, which is higher than that of the multi-primary-color display device of Comparative Example 2. Consequently, even if a display operation is conducted with the luminances of the subsets equalized with each other, the multi-primary-color display device 100 can still raise the upper limit of pixel's luminance.

Preferred Embodiment 3

In the foregoing description, one pixel preferably includes five subpixels. However, the present invention is in no way limited to that specific preferred embodiment. A single pixel may include six subpixels, for example.

Hereinafter, a third preferred embodiment of a multi-primary-color display device according to the present invention will be described. The multi-primary-color display device of this preferred embodiment has the similar configuration as the counterpart of the first preferred embodiment that has already been described with reference to FIG. 2 except that a single pixel preferably includes six subpixels in this preferred embodiment. Thus, the description of their common features will be omitted herein to avoid redundancies.

Figure 4:
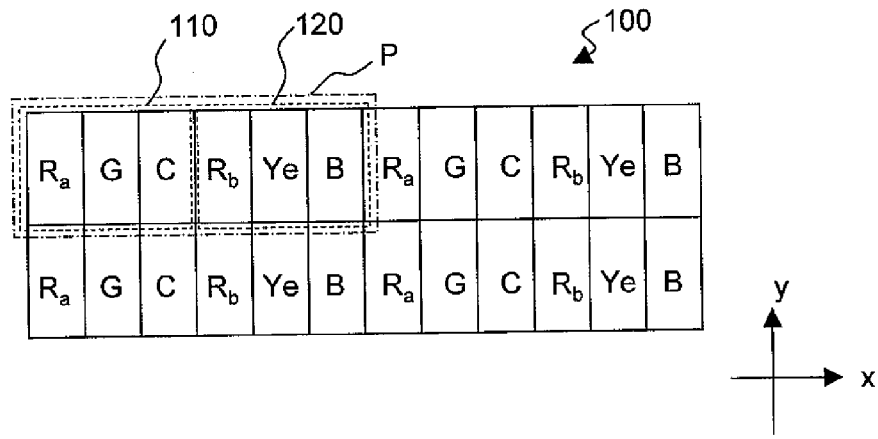
FIG. 4 is a schematic representation illustrating the arrangement of subpixels in a multi-primary-color display device as a third preferred embodiment of the present invention.

As shown in FIG. 4, in the multi-primary-color display device 100 of this preferred embodiment, each pixel P has a first subset 110 including red, green and cyan subpixels Ra, G and C and a second subset 120 including another red, yellow and blue subpixels Rb, Ye and B. That is to say, each pixel P includes six different types of subpixels, namely, a red subpixel Ra, a green subpixel G, a cyan subpixel C, another red subpixel Rb, a yellow subpixel Ye and a blue subpixel B. In each pixel P, the red, green and cyan subpixels Ra, G and C included in the first subset 110 are arranged in series in the x direction, while the red, yellow and blue subpixels Rb, Ye and B included in the second subset 120 are also arranged in series in line with the subpixels included in the first subset 110. That is to say, the first and second subsets 110 and 120 of the pixel P are adjacent to each other in the x direction. Meanwhile, in two pixels P that are adjacent to each other in the column direction (i.e., in y direction), two subsets of the same type are adjacent to each other in the column direction. In following description of preferred embodiments, the red subpixel Ra of the first subset 110 will be referred to herein as a "first red subpixel" and the red subpixel Rb of the second subset 120 a "second red subpixel", respectively.

The first and second red subpixels Ra and Rb are connected to the same scan line (not shown) but two different signal lines (not shown, either), and the second red subpixel Rb is controlled independently of the first red subpixel Ra. Nevertheless, the second red subpixel Rb has been made by the similar process as the first red subpixel Ra. That is why if the same potential is applied to the respective subpixel electrodes (not shown) of the first and second red subpixels Ra and Rb, then the first and second red subpixels Ra and Rb will exhibit the same chromaticity and the same luminance. That is why the number of primary colors used in this multi-primary-color display device 100 could be said to be five. For that reason, in the following description, the first and second red subpixels Ra and Rb will sometimes be collectively referred to herein as just "red subpixels R".

The following Table 6 summarizes the chromaticity values x and y and the luminance values Y (%) of the respective subpixels in the multi-primary-color display device 100 of this preferred embodiment when those subpixels have their highest grayscale (e.g., the $255^{th}$ grayscale).

TABLE 6

| | x | y | Y (%) |
|---|---|---|---|
| R | 0.6581 | 0.3219 | 1.45 (15.8) |
| G | 0.2521 | 0.6579 | 1.95 (21.3) |
| B | 0.1471 | 0.0502 | 0.46 (5.0) |
| Ye | 0.4637 | 0.5248 | 3.96 (43.2) |
| C | 0.1520 | 0.2404 | 1.36 (14.8) |

In Table 6, the chromaticity values x and y for R are those of the first and second red subpixels Ra and Rb, while the luminance Y for R is the sum of the respective luminances of the first and second red subpixels Ra and Rb. That is why when the respective subpixels have the highest grayscale, the luminance (%) exhibited by each of the first and second red subpixels Ra and Rb is 0.73 (7.9).

Now let us compare the multi-primary-color display device 100 of this preferred embodiment shown in FIG. 4 to the conventional one shown in FIG. 16. In the conventional multi-primary-color display device shown in FIG. 16, each pixel has a subset of red, green and blue subpixels representing the three primary colors of light and a subset of cyan, yellow and magenta subpixels representing the three primary colors of colors. On the other hand, in the multi-primary-color display device 100 of this preferred embodiment, each pixel P includes the second red subpixel Rb in place of the magenta subpixel of the conventional multi-primary-color display device shown in FIG. 16, and therefore, each pixel P has two red subpixels. Hereinafter, it will be described what advantages will be achieved if each pixel P has a red subpixel instead of the magenta subpixel (see Japanese Patent Application No. 2005-274510).

If the number of primary colors for use to conduct a display operation is increased, then the number of subpixels per pixel increases. In that case, the area of each subpixel must decrease and the lightness of the color represented by each subpixel (corresponding to a Y value in the XYZ color system) must decrease, too. For example, if the number of primary colors for use in display operation is increased from three to six, then the area and lightness (i.e., Y value) of each subpixel should be approximately halved. The "lightness", as well as "hue" and "saturation", is one of the three major factors that determine the color. If the number of primary colors is increased, then the color reproduction range (i.e., the ranges of reproducible due and saturation) will expand on the xy chromaticity diagram. If the lightness decreased, however, then the actual color reproduction range (also including the lightness) could not be broad enough. Among other things, if the area of the red subpixel were cut down, then the Y value of the color red would decrease. In that case, the multi-primary-color display device shown in FIG. 16 could represent only a dark color red and could not represent the object color red fully.

On the other hand, in the multi-primary-color display device 100 of this preferred embodiment, two out of the six subpixels (i.e., the first and second red subpixels Ra and Rb) represent the color red. As a result, even for the color red, the device of this preferred embodiment can also cover Pointer's Color and can increase the lightness (i.e., Y value) of the color red compared to the multi-primary-color display device shown in FIG. 16, thus representing a brighter color red. Consequently, not just the hue and saturation ranges on the xy chromaticity diagram but also the actual color reproduction range including the lightness can be expanded as well. Although no pixels of this multi-primary-color display device 100 have a magenta subpixel, the object color magenta can be easily reproduced by adding together the colors of the first and second red subpixels Ra and Rb and the blue subpixel B. For these reasons, if each pixel P has the second red subpixel in place of the magenta subpixel, the object color red can be represented sufficiently.

Figure 5:
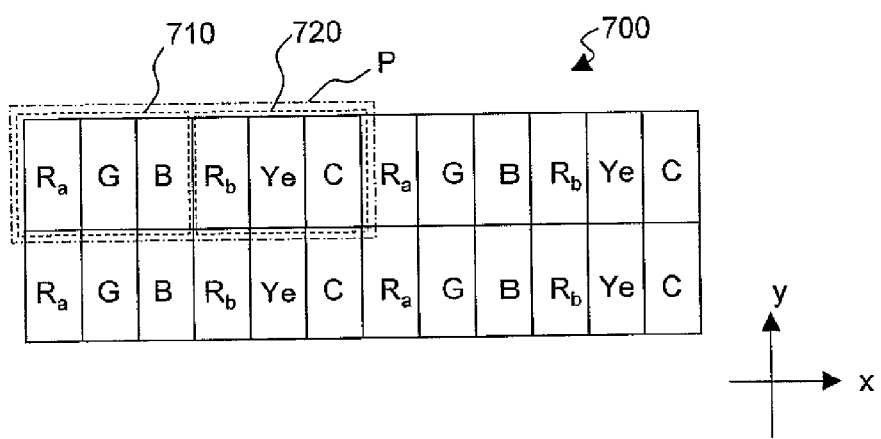
FIG. 5 is a schematic representation illustrating the arrangement of subpixels in a multi-primary-color display device as Comparative Example 3.

Hereinafter, the advantages of the multi-primary-color display device 100 of this preferred embodiment over a multi-primary-color display device as Comparative Example 3 will be described. First of all, the multi-primary-color display device as Comparative Example 3 will be described. FIG. 5 is a schematic representation illustrating the multi-primary-color display device 700 of Comparative Example 3, of which each pixel has a first subset 710 including red, green and blue subpixels Ra, G and B and a second subset 720 including another red, yellow and cyan subpixels Rb, Ye and C. The multi-primary-color display device 700 of Comparative Example 3 includes subpixels, of which the chromaticity values and luminances are the same as the counterparts of the multi-primary-color display device 100 of this preferred embodiment. In the multi-primary-color display device 700, however, the cyan subpixel of the first subset and the blue subpixel of the second subset in the multi-primary-color display device 100 of this preferred embodiment are interchanged with each other.

The following Table 7 summarizes the maximum luminance Ys (%) in each subset of the multi-primary-color display device 700 of Comparative Example 3 in a situation where each subpixel has its highest grayscale, the maximum luminance Yp of each pixel thereof, the difference $\Delta$ Ys (%) in luminance between the two subsets, the chromaticity coordinates (x, y) and color temperatures of the subsets, and the difference $\Delta$ u'v' in chromaticity between the subsets. Since each pixel of the multi-primary-color display device 700 of Comparative Example 3 includes subpixels, of which the chromaticity values and luminances are the same as their counterparts of the multi-primary-color display device 100 of this preferred embodiment, the maximum luminance Yp of the pixel and the color temperatures of the multi-primary-color display device 700 of Comparative Example 3 are the same as those of the multi-primary-color display device 100 of this preferred embodiment.

TABLE 7

| | Comparative Example 3 | |
|---|---|---|
| | Subset | |
| | RGB | RYeC |
| Maximum luminance Ys (%) of subset | 3.15 (34.2) | 6.06 (65.8) |
| Maximum luminance Yp of pixel | 9.21 | |
| Luminance difference $\Delta$ Ys (%) between subsets | 2.91 (31.6) | |
| Chromaticity coordinates (x, y) | (0.2483, 0.2179) | (0.3783, 0.3920) |
| Color temperature (K) | 55652 | 4151 |
| Chromaticity difference $\Delta$ u'v' | 0.127 | |

In the multi-primary-color display device 700 of Comparative Example 3, the first subset 710 has chromaticity coordinates (0.2483, 0.2179) and a color temperature of 55652 K, while the second subset 720 has chromaticity coordinates (0.3783, 0.3920) and a color temperature of 4151 K. As shown in Table 7, the multi-primary-color display device 700 of Comparative Example has a relatively large ratio of the luminance difference $\Delta$ Ys and a relatively big chromaticity difference $\Delta$ u'v' between the subsets. That is why when the pixel represents the color white, the subsets 710 and 720 appear to represent mutually different colors. As a result, the multi-primary-color display device 700 of Comparative Example 3 cannot conduct a display operation with substantially high resolution. Also, if in the second subset 720, the luminances are not used up to its maximum value Ys of 6.06 but have their upper limit defined to be 3.15, which is equal to the maximum luminance Ys of the first subset 710, then a display operation can be conducted with the luminances of the two subsets 710, 720 matched to each other. In that case, however, when an achromatic color is displayed, the luminance of a pixel has too low an upper limit of 6.30 (=3.15×2) to allow the pixel to represent the achromatic color with high luminance.

Next, the multi-primary-color display device 100 of this preferred embodiment will be described. The following Table 8 also summarizes the maximum luminance Ys (%) in each subset in a situation where each subpixel of the multi-primary-color display device 100 has its highest grayscale, the maximum luminance Yp of each pixel thereof, the difference $\Delta$Ys (%) between the luminances of the two subsets, the chromaticity coordinates (x, y) and color temperatures of the subsets, and the difference $\Delta$u'v' in chromaticity between the subsets. In Table 8, the values of the multi-primary-color display device of Comparative Example 3 shown in Table 7 are also shown for reference.

TABLE 8

|  | Comparative Example 3 Subset | | This embodiment | |
| --- | --- | --- | --- | --- |
|  | RGB | RYeC | RGC | RYeB |
| Maximum luminance Ys (%) of subset | 3.15 (34.2) | 6.06 (65.8) | 4.04 (43.9) | 5.16 (56.1) |
| Maximum luminance Yp of pixel | 9.21 | | 9.21 | |
| Luminance difference $\Delta$Ys (%) between subsets | 2.91 (31.6) | | 1.12 (12.2) | |
| Chromaticity coordinates (x, y) | (0.2483, 0.2179) | (0.3783, 0.3920) | (0.2841, 0.3713) | (0.3328, 0.2702) |
| Color temperature (K) | 55652 | 4151 | 7534 | 5450 |
| Chromaticity difference $\Delta$u'v' | 0.127 | | 0.088 | |

In the multi-primary-color display device 100 of this preferred embodiment, the first subset has chromaticity coordinates (0.2841, 0.3713) and a color temperature of 7534 K, while the second subset has chromaticity coordinates (0.3328, 0.2702) and a color temperature of 5450 K. As also shown in Table 8, in the multi-primary-color display device of Comparative Example 3, the ratio of the difference $\Delta$Ys in luminance between the subsets is 31.6% and the chromaticity difference $\Delta$u'v' is 0.127. In the multi-primary-color display device 100 of this preferred embodiment, on the other hand, the ratio of the difference $\Delta$Ys in luminance between the subsets is 12.2% and the chromaticity difference $\Delta$u'v' is 0.088. Also, in the multi-primary-color display device 100 of this preferred embodiment, the color temperatures of the subsets are closer to the reference value of 6500 K than in the multi-primary-color display device of Comparative Example 3. That is why comparing the multi-primary-color display device 100 to the counterpart 700 of Comparative Example 3, it can be seen that the ratio of the luminance difference $\Delta$Ys and the chromaticity difference $\Delta$u'v' of this multi-primary-color display device 100 are smaller than those of the multi-primary-color display device of Comparative Example 3. Consequently, the multi-primary-color display device 100 of this preferred embodiment can reduce the variations in chromaticity and luminance between the subsets.

Furthermore, in the multi-primary-color display device 100, the lower one of the respective maximum luminances Ys of the two subsets is 4.04, which is higher than that of the multi-primary-color display device of Comparative Example 3. That is why even if an achromatic color is represented with the respective luminances of the two subsets equalized with each other, the luminance of the pixel can still have a relatively high upper limit of 8.08 (=4.04×2). As a result, an achromatic color with high luminance can be represented.

As described above, the multi-primary-color display device 100 of this preferred embodiment has an arrangement of subpixels in which the blue and cyan subpixels of the two subsets 710 and 720 in the multi-primary-color display device 700 of Comparative Example 3 are interchanged with each other, and therefore, can reduce the ratio of the luminance difference $\Delta$Ys and the chromaticity difference $\Delta$u'v' between the subsets when an achromatic color is represented with the grayscale values of the respective subpixels increased to the highest ones. As a result, when an achromatic color is represented with a high luminance maintained, the resolution can be increased substantially.

Figure 6:
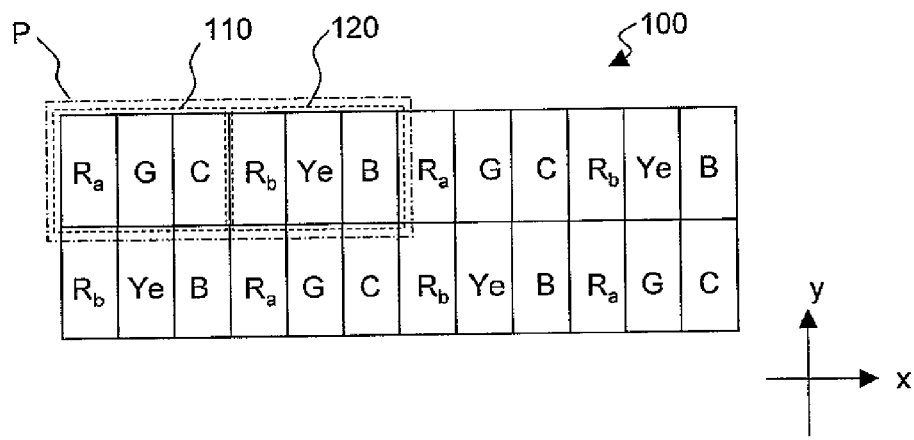
FIG. 6 is a schematic representation illustrating the arrangement of subpixels in a multi-primary-color display device as a modified example of the third preferred embodiment of the present invention.

In the examples described above, in two pixels that are adjacent to each other in the column direction (i.e., in the y direction), two subsets of the same type are adjacent to each other in the column direction. However, the present invention is in no way limited to those specific examples. In two pixels that are adjacent to each other in the column direction, two different subsets may be adjacent to each other in the column direction as shown in FIG. 6. In that case, the RGC and RYeB subsets are arranged to form a lattice (or checkered) pattern.

Figure 7:
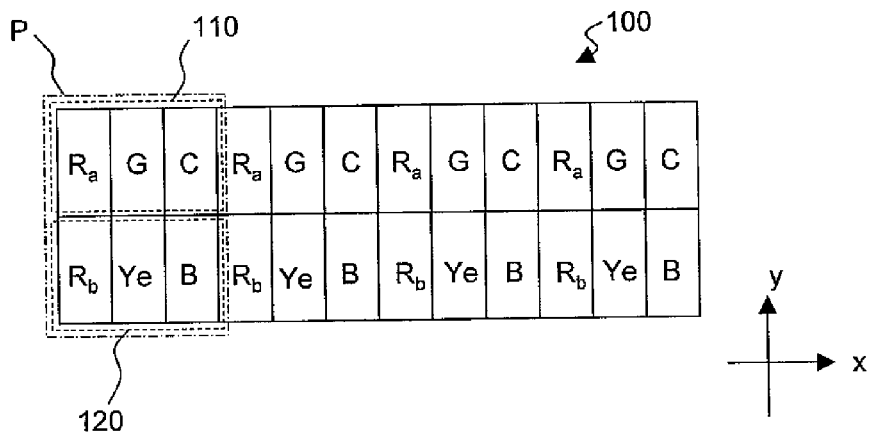
FIG. 7 is a schematic representation illustrating the arrangement of subpixels in a multi-primary-color display device as another modified example of the third preferred embodiment of the present invention.

Also, in the examples described above, the first and second subsets 110 and 120 included in a single pixel are arranged one-dimensionally in a striped pattern. However, the present invention is in no way limited to those specific examples. The red, yellow and blue subpixels Rb, Ye and B included in the second subset 120 may also be arranged parallel to the direction in which the subpixels included in the first subset 110 are arranged in the pixel P as shown in FIG. 7. In that case, the first and second subsets 110 and 120 included in the same pixel are arranged two-dimensionally so as to be adjacent to each other in the column direction, and each subpixel of the second subset 120 is adjacent to its associated subpixel of the first subset. In conducting a graphics display operation, the yellow and green subpixels belonging to the same pixel are preferably arranged in line as shown in FIG. 7.

Figure 8:
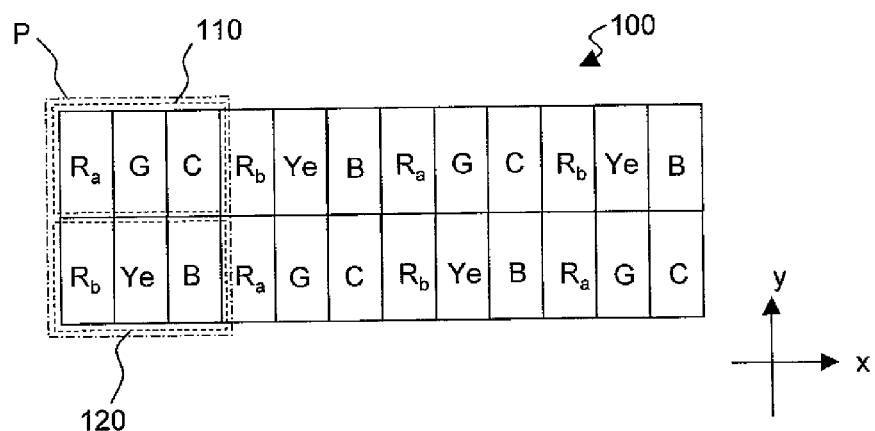
FIG. 8 is a schematic representation illustrating the arrangement of subpixels in a multi-primary-color display device as still another modified example of the third preferred embodiment of the present invention.

Still alternatively, the first and second subsets 110 and 120 included in a single pixel P may be arranged two-dimensionally so as to be adjacent to each other in the column direction (i.e., in the y direction) and two different types of subsets may be adjacent to each other in the row direction (i.e., in the x direction) in which two pixels are arranged as shown in FIG. 8. In that case, the first and second subsets 110 and 120 are arranged in a checkered pattern. In addition, even in the arrangement of subpixels shown in FIG. 8, the yellow and green subpixels belonging to the same pixel P may also be arranged in line.

It should be noted that if the subpixels included in a single pixel P are arranged in line in the row direction as shown in FIGS. 4 and 6, the decrease in resolution in the column direction (i.e., in the y direction) can be checked. Meanwhile, in a situation where a smaller number of subpixels belonging to the same pixel P are arranged in the row direction (i.e., in the x direction) as shown in FIGS. 7 and 8, when a single color (such as green) is represented by a single pixel, the interval between ON-state subpixels on a single row can be narrowed. As a result, the decrease in resolution in the row direction can be minimized when a single color is represented. Also, if yellow and green subpixels Ye and G with relatively high luminances are arranged in mutually different rows or columns, then a zigzag line will be seen on the screen when a single line is displayed in a single color such as yellow or green. However, if the yellow subpixels Ye or green subpixels G are arranged in line either in the column direction (i.e., in the y direction) or in the row direction (i.e., in the x direction) as shown in FIGS. 4 and 6, then a single line in a single color such as yellow or green can be displayed appropriately, thus contributing to getting a graphics display operation done properly.

In each of the arrangements of subpixels as shown in the FIGS. 4, 6, 7 and 8, the subpixels included in the first subset 110 are arranged in the order of the red, green and cyan subpixels, and the subpixels included in the second subset 120 are arranged in the order of the red, yellow and blue subpixels. However, the present invention is in no way limited to those specific examples. The subpixels of the first subset 110 and the second subset 120 are arranged in another order.

Furthermore, in the examples described above, the subpixels included in the first subset 110 and the subpixels included in the second subset 120 preferably are all arranged in series in the row direction (i.e., in the x direction). However, the present invention is in no way limited to those specific examples. The subpixels included in the first subset 110 and the subpixels included in the second subset 120 may also be arranged in series in the column direction (i.e., in the y direction).

Furthermore, in the examples described above, since the first and second red subpixels Ra and Rb preferably have the same property, the first and second red subpixels Ra and Rb coming from the same pixel of a video signal preferably have the same luminance. However, the present invention is in no way limited to those specific examples. If the luminance values of those red subpixels Ra and Rb are controlled independently of each other, then the viewing angle dependence of the γ characteristic (i.e., the γ characteristic varies depending on whether the image on the screen is viewed straight or obliquely) can be reduced.

As a technique for reducing the viewing angle dependence of the γ characteristic, a so-called "multi-pixel driving" method is proposed in Japanese Patent Application Laid-Open Publications Nos. 2004-62146 and 2004-78157. According to that technique, a single subpixel is split into two regions and mutually different voltages are applied to those regions, thereby reducing the viewing angle dependence of the γ characteristic. However, if a configuration for controlling the first and second red subpixels Ra and Rb independently of each other is adopted, mutually different voltages can be naturally applied to the respective liquid crystal layers of the first and second red subpixels Ra and Rb. For that reason, the viewing angle dependence of the γ characteristic can be reduced as much as by the multi-pixel driving technique disclosed in Japanese Patent Application Laid-Open Publications Nos. 2004-62146 and 2004-78157.

Furthermore, in the examples described above, the first and second red subpixels Ra and Rb preferably have the same property. However, the present invention is in no way limited to those specific examples. The first and second red subpixels Ra and Rb could have mutually different properties.

Also, in the examples described above, the first and second red subpixels Ra and Rb preferably are connected to the same scan line (not shown). However, the present invention is in no way limited to those specific preferred embodiments. The first and second red subpixels Ra and R could be connected to mutually different scan lines.

Furthermore, in the preferred embodiment described above, the second subset 120 preferably includes the second red subpixel Rb. However, the present invention is in no way limited to that specific preferred embodiment. The second subset 120 may have a magenta subpixel instead of the second red subpixel Rb.

Preferred Embodiment 4

Hereinafter, a fourth preferred embodiment of a multi-primary-color display device according to the present invention will be described. The multi-primary-color display device of this preferred embodiment has the similar configuration as the counterpart of the second preferred embodiment that has already been described with reference to FIG. 3 except that a single pixel preferably includes six subpixels in this preferred embodiment. Also, the multi-primary-color display device of this preferred embodiment has the similar configuration as the counterpart of the third preferred embodiment except that the device of this preferred embodiment further includes the adjusting section 400 shown in FIG. 3. Thus, the description of common features between this preferred embodiment and the second or third preferred embodiment will be omitted herein to avoid redundancies.

Hereinafter, the advantages of the multi-primary-color display device 100 of this preferred embodiment over a multi-primary-color display device as Comparative Example 4 will be described. The multi-primary-color display device of Comparative Example 4 has the similar arrangement of subpixels as the one shown in FIG. 5, and adjusts the luminances of the subpixels, thereby reducing the ratio of the luminance difference $\Delta Ys$ and the chromaticity difference $\Delta u'v'$ between the subsets when an achromatic color is represented.

The following Table 9 summarizes the maximum luminance Ys (%) in each subset of the multi-primary-color display device of Comparative Example 4 when an achromatic color is represented, the luminance ratio and the grayscale values of the respective subpixels, the maximum luminance Yp of each pixel thereof, the difference $\Delta Ys$ (%) in luminance between the subsets, the chromaticity coordinates (x, y) of the subsets, and the difference $\Delta u'v'$ in chromaticity between the subsets.

TABLE 9

| | Comparative Example 4 | |
|---|---|---|
| | Subset | |
| | RGB | RYeC |
| Maximum luminance Ys (%) of subset | 3.05 (40.0) | 4.57 (60.0) |
| Luminance ratio | (1, 1, 0.78) | (1, 0.63, 1) |
| Grayscale values | (255, 255, 228) | (255, 207, 255) |
| Maximum luminance Yp of pixel | 7.62 | |
| Luminance difference $\Delta$ Ys (%) between subsets | 1.53 (20.0) | |

TABLE 9-continued

| Comparative Example 4 | | |
|---|---|---|
| | Subset | |
| | RGB | RYeC |
| Chromaticity coordinates (x, y) | (0.2628, 0.2415) | (0.3591, 0.3618) |
| Chromaticity difference $\varDelta$ u'v' | 0.090 | |

In the multi-primary-color display device of Comparative Example 4, the first subset has chromaticity coordinates (0.2628, 0.2415), while the second subset has chromaticity coordinates (0.3591, 0.3618). Also, in the multi-primary-color display device of Comparative Example 4, the blue subpixel of the first subset and the yellow subpixel of the second subset had their luminances adjusted.

In the multi-primary-color display device of Comparative Example 4, not only the ratio of the luminance difference $\varDelta$ Ys (of 20.0%) between the subsets but also the lower one (of 3.05) of the maximum luminances Ys of the subsets are smaller than those of the multi-primary-color display device of Comparative Example 3. Also, compared to the multi-primary-color display device of Comparative Example 3, the device of this Comparative Example 4 has a significantly lower luminance ratio of 83% (=7.62/9.21) with respect to the maximum luminance Yp of the pixel.

Next, the multi-primary-color display device 100 of this preferred embodiment will be described. The following Table 10 also summarizes the maximum luminance Ys (%) in each subset of the multi-primary-color display device 100 of this preferred embodiment when an achromatic color is represented, the luminance ratio and the grayscale values of the respective subpixels, the maximum luminance Yp of each pixel thereof, the difference $\varDelta$ Ys (%) in luminance between the subsets, the chromaticity coordinates (x, y) of the subsets, and the difference $\varDelta$ u'v' in chromaticity between the subsets. In the multi-primary-color display device 100 of this preferred embodiment, the luminances of the subpixels are adjusted so as to reduce the ratio of the luminance difference $\varDelta$ Ys between the subsets. In Table 10, the values of the multi-primary-color display device of Comparative Example 4 shown in Table 9 are also shown for reference.

TABLE 10

| | Comparative Example 4 | | This embodiment | |
|---|---|---|---|---|
| | Subset | | | |
| | RGB | RYeC | RGC | RYeB |
| Maximum luminance Ys (%) of subset | 3.05 (40.0) | 4.57 (60.0) | 4.04 (50.0) | 4.04 (50.0) |
| Luminance ratio | (1, 1, 0.78) | (1, 0.63, 1) | (1, 1, 1) | (0.5, 0.83, 0.83) |
| Grayscale values | (255, 255, 228) | (255, 207, 255) | (255, 255, 255) | (187, 235, 235) |
| Maximum luminance Yp of pixel | 7.62 | | 8.09 | |
| Luminance difference $\varDelta$ Ys (%) between subsets | 1.53 (20.0) | | 0.00 (0.00) | |

TABLE 10-continued

| | Comparative Example 4 | | This embodiment | |
|---|---|---|---|---|
| | Subset | | | |
| | RGB | RYeC | RGC | RYeB |
| Chromaticity coordinates (x, y) | (0.2628, 0.2415) | (0.3591, 0.3618) | (0.2841, 0.3713) | (0.3168, 0.2677) |
| Chromaticity difference $\varDelta$ u'v' | 0.090 | | 0.082 | |

In the multi-primary-color display device 100 of this preferred embodiment, the first subset has chromaticity coordinates (0.2841, 0.3713), while the second subset has chromaticity coordinates (0.3168, 0.2677). It should be noted that in the multi-primary-color display device 100 of this preferred embodiment, the red, yellow and blue subpixels in the second subset had their luminances adjusted but no subpixels in the first subset had their luminance adjusted, thereby reducing the luminance difference between the subsets to zero.

In the multi-primary-color display device of Comparative Example 4, when the luminances of the blue and yellow subpixels are adjusted, the maximum luminance Yp of the pixel is as low as 7.62 and the luminance ratio decreases to 83%. In the multi-primary-color display device 100 of this preferred embodiment, on the other hand, even if the luminances of the red, yellow and blue subpixels are adjusted, the maximum luminance Yp of the pixel is still as high as 8.09. And the ratio of the luminance in a pixel of the multi-primary-color display device of this preferred embodiment to that of the device of the third preferred embodiment is also as high as 88% (=8.09/9.21).

As described above, the multi-primary-color display device 100 of this preferred embodiment adjusts the luminances of subpixels included in one of the two subsets, thereby further reducing the ratio of the luminance difference $\varDelta$ Ys between the sub-sets. In addition, even if such adjustment is made, the multi-primary-color display device 100 of this preferred embodiment can still keep the maximum luminance Yp of the pixel sufficiently high and can check the decrease in the luminance ratio of the pixel compared to a situation where no adjustment is made. Consequently, the multi-primary-color display device 100 can represent an achromatic color with high luminance and with substantially high resolution.

Preferred Embodiment 5

In the foregoing description, it has been described how the resolution can be increased substantially when an achromatic color is represented. According to the present invention, however, the resolution can also be increased substantially even when any other color needs to be represented.

Hereinafter, a fifth preferred embodiment of a multi-primary-color display device according to the present invention will be described.

Figure 9:
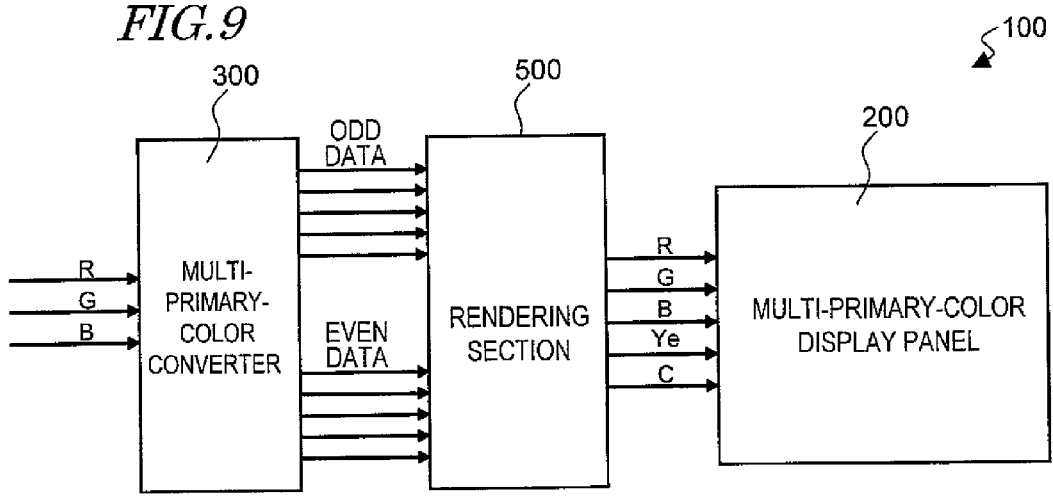
FIG. 9 is a block diagram illustrating a configuration for a multi-primary-color display device as a fifth preferred embodiment of the present invention.

As shown in FIG. 9, the multi-primary-color display device 100 of this preferred embodiment includes the multi-primary-color display panel 200, the multi-primary-color converter 300 and a rendering section 500. The multi-primary-color display device 100 of this preferred embodiment has the similar configuration as its counterpart shown in FIG. 2 except that the device of this preferred embodiment further includes the rendering section 500. Thus, the description of their common features will be omitted herein to avoid redundancies. In this case, the horizontal resolution of the video signal is greater than the number of pixels in the row direction of the multi-primary-color display panel 200 (i.e., the horizontal resolution of the multi-primary-color display panel 200). Supposing the multi-primary-color display panel 200 has a horizontal resolution of N, the video signal has a horizontal resolution of 2×N. The respective subpixels have the same chromaticity values x, y and luminances Y as the ones shown in Table 6.

The multi-primary-color converter 300 performs a multi-primary-color conversion on a value of the video signal representing the red, green and blue luminances, thereby generating a multi-primary-color signal representing the luminances of the primary colors associated with the respective subpixels. And the rendering section 500 performs rendering processing on the value of the multi-primary-color signal representing the luminances of the primary colors associated with the respective subpixels. In this preferred embodiment, the video signal is supposed to be accordance with the progressive format.

As shown in FIG. 9, in the multi-primary-color display device 100 of this preferred embodiment, the multi-primary-color converter 300 generates odd data based on a value of the video signal representing the red, green and blue luminances of a pixel (such as a pixel on an odd-numbered column) and also generates even data based on a value of the video signal representing the red, green and blue luminances of an adjacent pixel (e.g., a pixel on an even-numbered column). Next, the rendering section 500 performs the rendering processing on the luminances of the respective primary colors, which are represented by the multi-primary-color signal, based on the odd data and even data. As a result, the respective subpixels of each pixel of the multi-primary-color display panel 200 come to have the luminances of the primary colors that have been subjected to the rendering processing. In this case, the rendering section 500 performs the rendering processing based on the achromatic color components in the color of the pixel of the video signal, which are associated with the respective subsets, with the chromatic color components of its adjacent pixel taken into account.

Figure 10A:
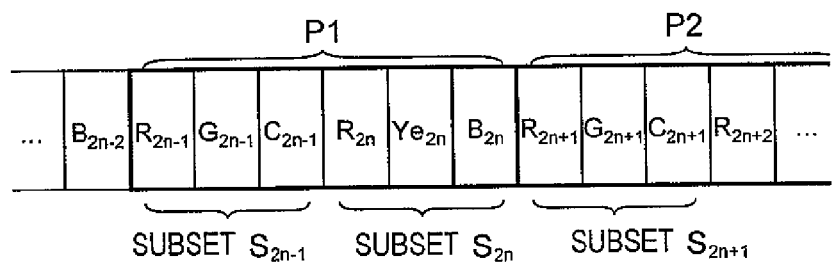

Hereinafter, the relations between the values of the even and odd data that have been subjected to the multi-primary-color conversion and the subsets in the multi-primary-color display panel 200 will be described with reference to FIGS. 10A and 10B. Specifically, FIG. 10A is a schematic representation illustrating the arrangement of subpixels on the multi-primary-color display panel 200. On the other hand, FIG. 10B shows the luminance values of the primary colors associated with the respective subpixels, which have been obtained by subjecting the odd and even data to the multi-primary-color conversion.

As shown in FIG. 10A, in pixels of the multi-primary-color display panel 200, the respective subpixels are arranged cyclically in the row direction in the order of the red, green, cyan, red, yellow and blue subpixels R, G, C, R, Ye and B as in FIG. 4. In FIG. 10A, the $(n-1)^{th}$ subset including red, green and cyan subpixels $R_{2n-1}$, $G_{2n-1}$ and $C_{2n-1}$, the $n^{th}$ subset including red, yellow and blue subpixels $R_{2n}$, $Ye_{2n}$ and $B_{2n}$, and the $(n+1)^{th}$ subset including red, green and cyan subpixels $R_{2n+1}$, $G_{2n+1}$ and $C_{2n+1}$ are called subsets $S_{2n-1}$, $S_{2n}$ and $S_{2n+1}$, respectively. The subsets $S_{2n-1}$ and $S_{2n}$ correspond to the first and second subsets 110 and 120 included in a pixel P1, while the subset $S_{2n+1}$ corresponds to the first subset 110 of a pixel P2 that is adjacent to the pixel P1.

As described above, in this preferred embodiment, the video signal has a horizontal resolution of 2×N, while the multi-primary-color display panel 200 has a horizontal resolution of N. And the horizontal resolution 2×N of the video signal corresponds to the number of subsets in the horizontal direction on the multi-primary-color display panel 200. In the following description, the pixels of the video signal corresponding to the subsets $S_{2n-1}$, $S_{2n}$ and $S_{2n+1}$ will be identified herein by $p_{2n-1}$, $p_{2n}$ and $p_{2n+1}$, respectively, which are pixels that are adjacent to each other on the same row of the video.

Figure 10B:
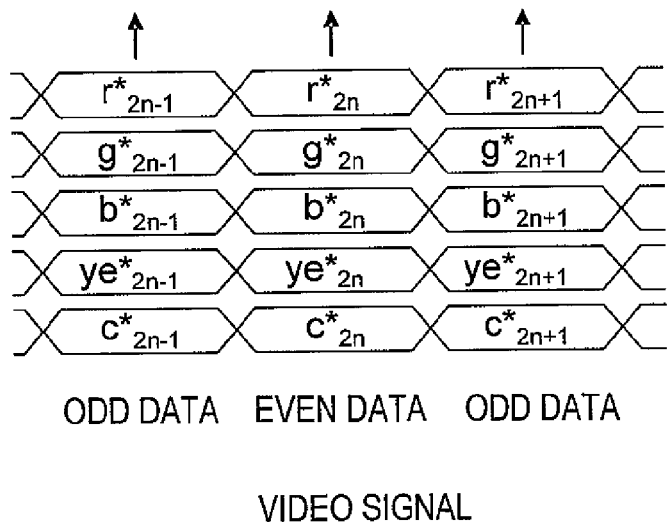

In FIG. 10B, $r^*_{2n-1}$, $g^*_{2n-1}$, $b^*_{2n-1}$, $ye^*_{2n-1}$ and $c^*_{2n-1}$ are the luminance values of the primary colors associated with the respective subpixels, which have been obtained by subjecting a value of the video signal representing the color of the pixel $p_{2n-1}$ to the multi-primary-color conversion. In the same way, $r^*_{2n}$, $g^*_{2n}$, $b^*_{2n}$, $ye^*_{2n}$ and $c^*_{2n}$ and $r^*_{2n+1}$, $g^*_{2n+1}$, $b^*_{2n+1}$, $ye^*_{2n+1}$ and $c^*_{2n-1}$ are values of the video signal representing the colors of the pixels $p_{2n}$ and $p_{2n+1}$, respectively.

Suppose the multi-primary-color display device has no rendering section 500. In that case, the luminances of the red, green and cyan subpixels $R_{2n-1}$, $G_{2n-1}$ and $C_{2n-1}$ included in the sub-set $S_{2n-1}$ would be determined by $r^*_{2n-1}$, $g^*_{2n-1}$, $b^*_{2n-1}$, $ye^*_{2n-1}$ and $c^*_{2n-1}$. For example, the luminances of the red, green and cyan subpixels $R_{2n\ 1}$, $G_{2n\ 1}$ and $C_{2n\ 1}$ become $r^*_{2n\ 1}$, $g^*_{2n\ 1}$ and $c^*_{2n\ 1}$, respectively. In the same way, the luminances of the red, yellow and blue subpixels $R_{2n}$, $Ye_{2n}$ and $B_{2n}$ included in the subset $S_{2n}$ and the luminances of the red, green and cyan subpixels $R_{2n+1}$, $G_{2n+1}$ and $C_{2n+1}$ included in the subset $S_{2n+1}$ would be $r^*_{2n}$, $ye^*_{2n}$ and $b^*_{2n}$ and $r^*2n+1$, $g^*_{2n+1}$, and $c^*_{2n+1}$, respectively. As can be seen, if the multi-primary-color display device had no rendering section 500, a half of the value obtained by the multi-primary-color conversion would not be reflected on the luminances of the respective subpixels in the multi-primary-color display panel 200. That is why the substantial horizontal resolution of the multi-primary-color display panel 200 is equal to its nominal resolution and becomes a half of the horizontal resolution of the video signal.

However, the multi-primary-color display device 100 of this preferred embodiment does include the rendering section 500, which determines the luminance values of the primary colors associated with the respective subpixels of the multi-primary-color display panel 200 by not just a value of the video signal representing the color of its associated pixel but also that of the video signal representing the color of an adjacent pixel.

Figure 11:
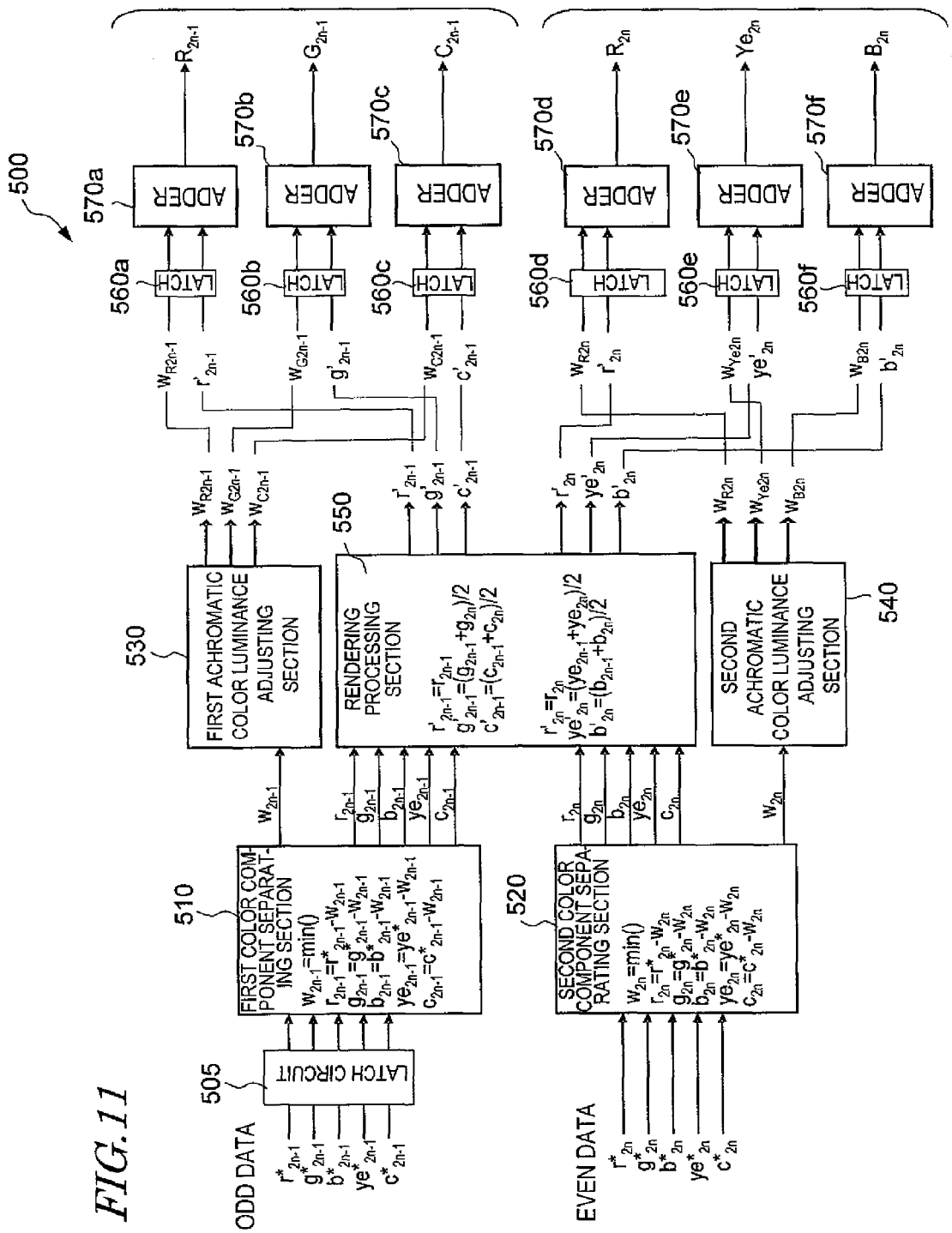
FIG. 11 is a block diagram illustrating the configuration of the rendering section in the multi-primary-color display device of the fifth preferred embodiment of the present invention.

FIG. 11 is a block diagram illustrating the rendering section 500 of the multi-primary-color display device 100 of this preferred embodiment. The rendering section 500 includes a latch circuit 505, color component separating sections 510 and 520, achromatic color luminance adjusting sections 530 and 540, a rendering processing section 550, latch circuits 560a through 560f, and adders 570a through 570f. In the following description, the color component separating sections 510 and 520 will be referred to herein as a "first color component separating section" and a "second color component separating section", respectively. Also, the achromatic color luminance adjusting sections 530 and 540 will be referred to herein as a "first achromatic color luminance adjusting section" and a "second achromatic color luminance adjusting section", respectively.

The odd data that has been generated as a result of the multi-primary-color conversion is latched by the latch circuit 505, and then the first color component separating section 510 separates the color of the pixel represented by the odd data into an achromatic color component and a chromatic color component. In the same way, the second color component separating section 520 separates the color of the pixel represented by the even data into an achromatic color component and a chromatic color component.

Figure 12A:
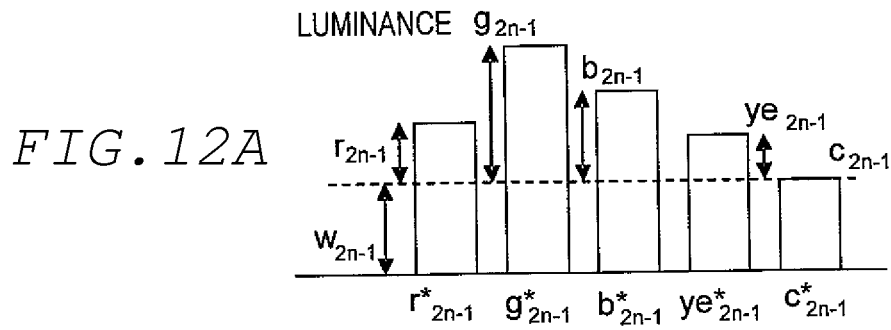
FIGS. 12A through 12C are schematic representations illustrating how a value obtained by subjecting a pixel of a video signal associated with a subset in the multi-primary-color display device of the fifth preferred embodiment to a multi-primary-color conversion is separated into achromatic color components and chromatic color components.
Figure 12B:
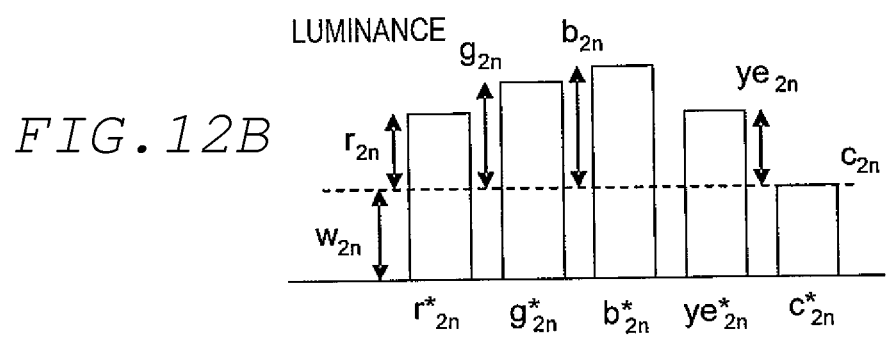
Figure 12C:
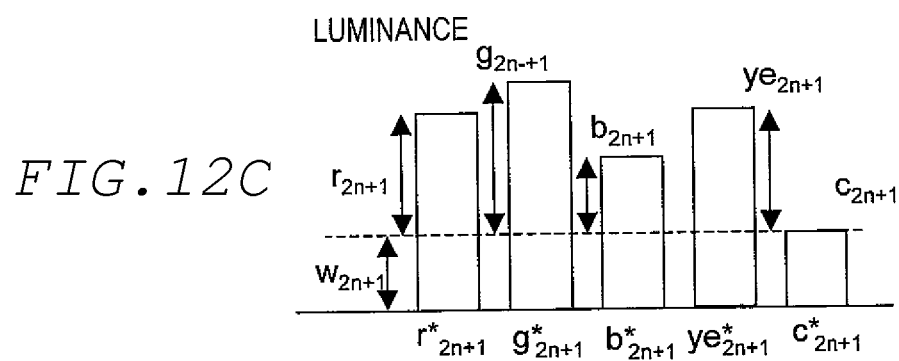

Hereinafter, it will be described with reference to FIGS. 12A-12C how the first and second color separating sections 510 and 520 separate the color into an achromatic color component and a chromatic color component. FIGS. 12A, 12B and 12C are bar graphs showing the values obtained by subjecting respective values of the video signal representing the colors of pixels $p_{2n-1}$, $p_{2n}$ and $p_{2n+1}$ to the multi-primary-color conversion. It should be noted that FIG. 11 shows the conversion of the values of the video signal representing the colors of only two pixels $p_{2n-1}$ and $p_{2n}$ but FIGS. 12A-12C shows the conversion of the values of the video signal representing the colors of three pixels $p_{2n-1}$, $p_{2n}$ and $p_{2n+1}$.

The first color component separating section 510 finds the smallest one of the values $r^*_{2n-1}$, $g^*_{2n-1}$, $b^*_{2n-1}$, $ye^*_{2n-1}$ and $c^*_{2n-1}$, which have been obtained by subjecting the value of the video signal representing the color of the pixel $p_{2n-1}$ to the multi-primary-color conversion. If $c^*_{2n-1}$ is found to be the smallest as shown in FIG. 12A, then this minimum value $c^*_{2n-1}$ is defined to be an achromatic color component $w_{2n-1}$. Also, the first color component separating section 510 subtracts the achromatic color component $w_{2n-1}$ from $r^*_{2n-1}$, $g^*_{2n-1}$, $b^*_{2n-1}$, $ye^*_{2n-1}$ and $x^*_{2n-1}$ and defines the remainders $r_{2n-1}$ $(=r^*_{2n-1}-w_{2n-1})$, $g_{2n-1}$ $(=g^*_{2n-1}-w_{2n-1})$, $b_{2n-1}$ $(=b^*_{2n-1}-w_{2n-1})$, $ye_{2n-1}$ $(=ye^*_{2n-1}-w_{2n-1})$, and $c_{2n-1}$ $(=c^*_{2n-1}-w_{2n-1})$ to be chromatic color components.

In the same way, the second color component separating section 520 finds the smallest one of the values $r^*_{2n}$, $g^*_{2n}$, $b^*_{2n}$, $ye^*_{2n}$ and $x^*_{2n}$, which have been obtained by subjecting the value of the video signal representing the color of the pixel $p_{2n}$ to the multi-primary-color conversion. If $c^*_{2n}$ is found to be the smallest as shown in FIG. 12B, then this minimum value $c^*_{2n}$ is defined to be an achromatic color component $w_{2n}$. Also, the second color component separating section 520 subtracts the achromatic color component $w_{2n}$ from $r^*_{2n}$, $g^*_{2n}$, $b^*_{2n}$, $ye^*_{2n}$ and $c^*_{2n}$ and defines the remainders to be chromatic color components.

Likewise, the first color component separating section 510 finds the smallest one of the values $r^*_{2n+1}$, $g^*_{2n+1}$, $b^*_{2n+1}$, $ye^*_{2n+1}$ and $c^*_{2n+1}$, which have been obtained by subjecting the value of the video signal representing the color of the pixel $p_{2n+1}$ to the multi-primary-color conversion. If $c^*_{2n+1}$ is found to be the smallest as shown in FIG. 12C, then this minimum value $c^*_{2n+1}$ is defined to be an achromatic color component $w_{2n+1}$. Also, the first color component separating section 510 subtracts the achromatic color component $w_{2n+1}$ from $r^*_{2n+1}$, $g^*_{2n+1}$, $b^*_{2n+1}$, $ye^*_{2n+1}$ and $c^*_{2n+1}$ and defines the remainders to be chromatic color components.

Now take a look at FIG. 11 again. The first achromatic color luminance adjusting section 530 determines values $w_{R2n-1}$, $w_{G2n-1}$, and $w_{C2n-1}$, which are associated with the achromatic color component $w_{2n-1}$ that has been separated by the first color component separating section 510. As a result, the achromatic color component $w_{2n-1}$ will be reflected on the luminances of the red, green and cyan subpixels $R_{2n-1}$, $G_{2n-1}$ and $C_{2n-1}$ included in the subset $S_{2n-1}$. On the other hand, the second achromatic color luminance adjusting section 540 determines values $w_{R2n}$, $w_{Ye2n}$, and $w_{B2n}$, which are associated with the achromatic color component $w_{2n}$ that has been separated by the second color component separating section 520. As a result, the achromatic color component $w_{2n}$ will be reflected on the luminances of the red, yellow and blue subpixels $R_{2n}$, $Ye_{2n}$ and $B_{2n}$ included in the subset $S_{2n}$.

The rendering processing section 550 determines values representing the respective chromatic color components of the red, green and cyan subpixels $R_{2n-1}$, $G_{2n-1}$ and $C_{2n-1}$ included in the subset $S_{2n-1}$ and the red, yellow and blue subpixels $R_{2n}$, $Ye_{2n}$ and $B_{2n}$ included in the subset $R_{2n}$ based on the chromatic color components $r_{2n-1}$, $g_{2n-1}$, $b_{2n-1}$, $ye_{2n-1}$ and $c_{2n-1}$ of the pixel $p_{2n-1}$ and on the chromatic color components $r_{2n}$, $g_{2n}$, $b_{2n}$, $ye_{2n}$ and $c_{2n}$ of the pixel $p_{2n}$. For example, the rendering processing section 550 determines values $r'_{2n-1}$, $g'_{2n-1}$ and $c'_{2n-1}$ representing the respective chromatic color components of the red, green and cyan subpixels $R_{2n-1}$, $G_{2n-1}$ and $C_{2n-1}$ included in the subset $S_{2n-1}$ to be $r'_{2n-1}=r_{2n-1}$, $g'_{2n-1}=(g_{2n-1}+g_{2n})/2$, and $c'_{2n-1}=(c_{2n-1}+c_{2n})/2$, respectively. Also, the rendering processing section 550 determines values $r'_{2n}$, $ye'_{2n}$ and $b'_{2n}$ representing the respective chromatic color components of the red, yellow and blue subpixels $R_{2n}$, $Ye_{2n}$ and $B_{2n}$ included in the subset $S_{2n}$ to be $r'_{2n}=r_{2n}$, $ye'_{2n}=(ye_{2n-1}+ye_{2n})/2$, and $b'_{2n}=(b_{2n-1}+b_{2n})/2$, respectively.

In this case, the sum of the chromatic color components of two adjacent pixels of a video signal is averaged (such a value will also be referred to herein as a "rendering value") for all of the subpixels but the red subpixels. This is because the pixel P has two red subpixels R with the same property and because 2N red subpixels are arranged in the row direction on the multi-primary-color display panel 200. That is why even without averaging the sum of the chromatic color components, each of those red subpixels can be displayed with the same horizontal resolution as the video signal.

Next, each of the adders 570a through 570f adds together two values representing the achromatic and chromatic color components that have been latched in an associated one of the latch circuits 560a through 560f, thereby obtaining a value representing the luminance of its associated subpixel. Specifically, the adder 570a calculates the sum of the value $w_{R2n-1}$ representing the achromatic color component and the value $r'_{2n-1}$ representing the chromatic color component as the value representing the luminance of the red subpixel $R_{2n-1}$. In the same way, the adders 570b and 570c calculate the values representing the respective luminances of the green and cyan subpixels $G_{2n-1}$ and $C_{2n-1}$. The adders 570a through 570c make the calculations by the following equations:

$$R_{2n-1}=w_{R2n-1}+r'_{2n-1}=w_{R2n-1}+r_{2n-1}$$

$$G_{2n-1}=w_{G2n-1}+g'_{2n-1}=w_{G2n-1}+(g_{2n-1}+g_{2n})/2$$

$$C_{2n-1}=w_{C2n-1}+c'_{2n-1}=w_{C2n-1}+(c_{2n-1}+c_{2n})/2$$

In this manner, the adders 570b and 570c add together the components $w_{C2n-1}$ and $w_{C2n-1}$ that are associated with the respective subpixels in the achromatic color component $w_{2n-1}$ of the color of the pixel $p_{2n-1}$ of the video signal and the rendering values $g'_{2n-1}$ and $c'_{2n-1}$ of their associated chromatic color components, thereby generating values representing the luminances of the subpixels. Meanwhile, the adder 570a adds together the components $w_{R2n-1}$ that is associated with the achromatic color component $w_{2n-1}$ of the color of the pixel $p_{2n-1}$ of the video signal and its associated chromatic color component $r'_{2n\ 1}$, thereby generating a value representing the luminance of the red subpixel.

In the same way, the adders 570d through 570f calculate the respective luminances of the red, yellow and blue subpixels $R_{2n}$, $Ye_{2n}$ and $B_{2n}$ included in the subset $S_{2n}$ by the following equations:

$$R_{2n}=w_{R2n}+r'_{2n}=w_{R2n}+r_{2n}$$

$$Ye_{2n}=w_{Ye2n}+ye'_{2n}=w_{Ye2n}+(ye_{2n-1}+ye_{2n})/2$$

$$B_{2n}=w_{B2n}+b'_{2n}=w_{B2n}+(b_{2n-1}+b_{2n})/2$$

In this manner, the adders 570e and 570f add together the components $w_{Ye2n}$ and $w_{B2n}$ that are associated with the respective subpixels in the achromatic color component $w_{2n}$ of the color of the pixel $p_{2n}$ of the video signal and the rendering values ye'$_{2n}$ and b'$_{2n}$ of their associated chromatic color components, thereby generating values representing the luminances of the subpixels. Meanwhile, the adder 570d adds together the components $w_{R2n}$ that is associated with the achromatic color component $w_{2n}$ of the color of the pixel $p_{2n}$ of the video signal and its associated chromatic color component r'$_{2n}$, thereby generating a value representing the luminance of the red subpixel.

The multi-primary-color display device 100 of this preferred embodiment determines the luminance of a subpixel in a sub-set by the achromatic and chromatic color components of the color of its associated pixel represented by a video signal and by the chromatic color component of the color of another pixel that is adjacent to the associated pixel represented by the video signal, thereby increasing the substantial resolution when a chromatic color with an achromatic color component is represented and minimizing the decrease in substantial resolution during a multi-primary-color display operation. For example, by representing the color yellow using a yellow subpixel for a subset that does include yellow (e.g., RYeB) and using R and G for a subset that does not include yellow (e.g., RGC), the decrease in the resolution of the color yellow can be minimized.

In the preferred embodiment described above, the values of subpixels included in two subsets of the same pixel (specifically, the subsets $S_{2n-1}$ and $S_{2n}$ shown in FIG. 10A) are determined based on the colors of pixels $p_{2n-1}$ and $p_{2n}$ of the video signal that are associated those two subsets. However, the present invention is in no way limited to that specific preferred embodiment. For example, the values of the respective subpixels may also be determined based on the color of a pixel of the video signal that is associated with a right adjacent subset.

Specifically, the rendering processing could also be carried out such that the luminances of the red, yellow and blue subpixels $R_{2n}$, $Ye_{2n}$ and $B_{2n}$ of the subset $S_{2n}$ are calculated by the adders 570d through 570f in accordance with the following equations:

$$R_{2n}=w_{R2n}+r'_{2n}=w_{R2n}+r_{2n}$$

$$Ye_{2n}=w_{Ye2n}+ye'_{2n}=w_{Ye2n}+(ye_{2n}+ye_{2n+1})/2$$

$$B_{2n}=w_{B2n}+b'_{2n}=w_{B2n}+(b_{2n}+b_{2n+1})/2$$

In this manner, the luminances $R_{2n}$, $Ye_{2n}$ and $B_{2n}$ of the respective subpixels may be determined by the values $w_{R2n}$, $w_{Ye2n}$ and $w_{B2n}$ of the subpixels that are associated with the achromatic color component $w_{2n}$ of the color of the pixel $p_{2n}$ of the video signal and by the chromatic color components $r_{2n}$, $ye_{2n}$, and $b_{2n}$ of the color of the pixel $p_{2n}$ of the video signal and the chromatic color components $r_{2n+1}$, $ye_{2n+1}$, and $b_{2n+1}$ of the color of the pixel $p_{2n+1}$ of the video signal.

It should be noted that the equations described above are just examples. Therefore, the luminances of the respective subpixels may also be calculated by any other set of equations.

Also, in the preferred embodiment described above, the two red subpixels R of the same pixel P are made in the same way and have the same luminance. However, the present invention is in no way limited to that specific preferred embodiment. The two red subpixels R could also have different luminances as well.

Furthermore, in the preferred embodiment described above, a single pixel P includes six subpixels. However, the present invention is in no way limited to that specific preferred embodiment. A single pixel P may also include five subpixels as shown in FIG. 1.

Preferred Embodiment 6

In the preferred embodiments described above, each subset preferably represents an achromatic color. However, the present invention is in no way limited to that specific preferred embodiment. An achromatic color could also be represented by a subset and subpixels adjacent to that subset.

Hereinafter, a sixth preferred embodiment of a multi-primary-color display device according to the present invention will be described.

The multi-primary-color display device 100 of this preferred embodiment has the similar configuration as the counterpart of the fifth preferred embodiment that has already been described with reference to FIG. 11 except for a portion of the processing done by the rendering section 500. Thus, the description of their common features will be omitted herein to avoid redundancies. In the following description of the sixth preferred embodiment, achromatic colors associated with the first and second subsets 110 and 120 will be referred to herein as a "first achromatic color" and a "second achromatic color", respectively.

Figure 13:
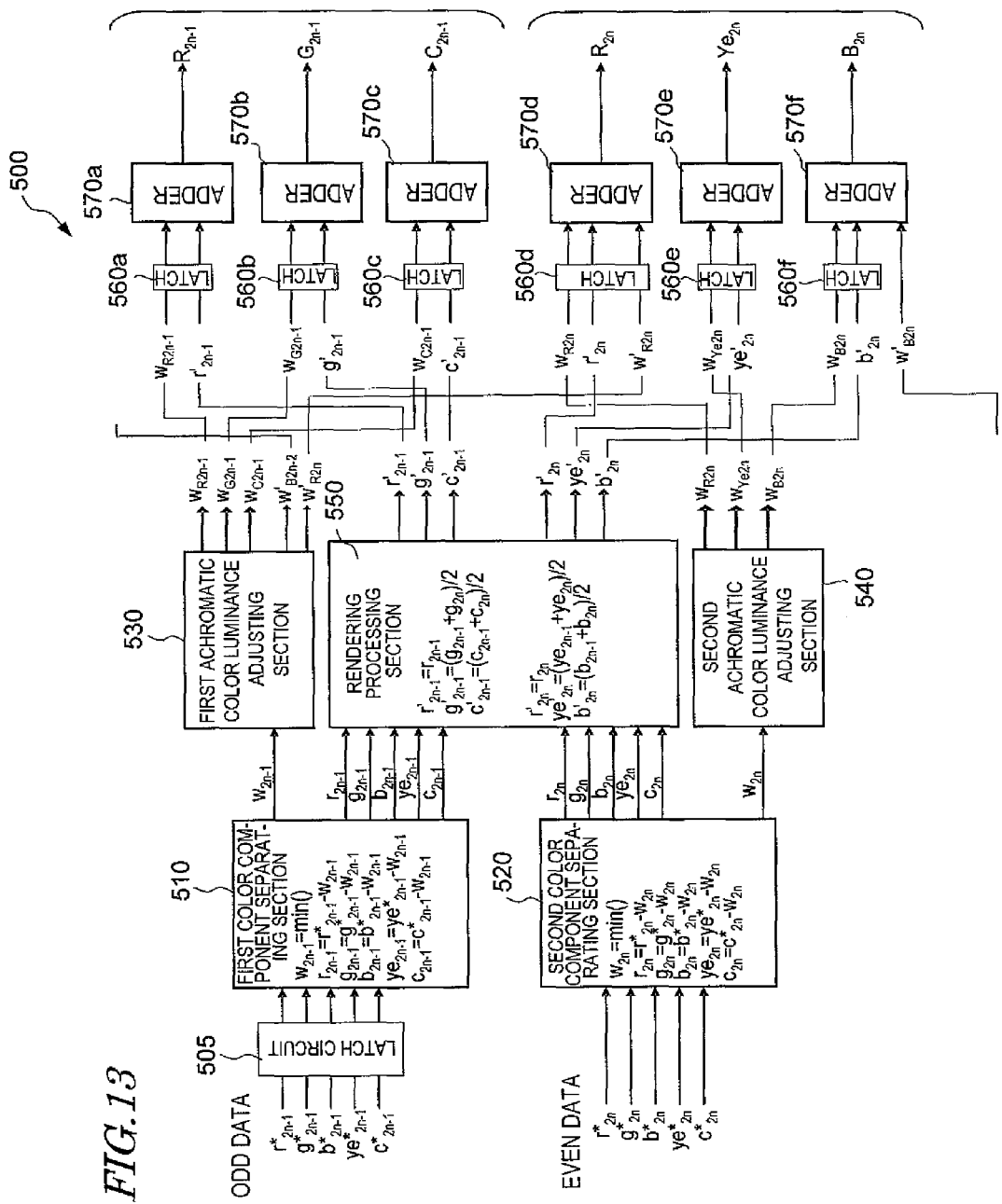
FIG. 13 is a block diagram illustrating the configuration of a rendering section in a multi-primary-color display device as a sixth preferred embodiment of the present invention.

FIG. 13 is a block diagram illustrating the rendering section 500 of the multi-primary-color display device 100 of this preferred embodiment. The rendering section 500 includes a latch circuit 505, first and second color component separating sections 510 and 520, first and second achromatic color luminance adjusting sections 530 and 540, a rendering processing section 550, latch circuits 560a through 560f, and adders 570a through 570f.

Hereinafter, the luminances of respective subpixels to represent an achromatic color in the multi-primary-color display device 100 will be described with reference to FIGS. 14A and 14B, which are schematic representations illustrating the luminances of subpixels to represent the first achromatic color and those of subpixels to represent the second achromatic color, respectively.

As shown in FIG. 14A, by setting the luminances of not only the red, green and cyan subpixels $R_{2n-}$, $G_{2n-1}$ and $C_{2n-1}$ included in the first subset $S_{2n-1}$ but also the blue and red subpixels $B_{2n-2}$ and $R_{2n}$ that are adjacent to the first subset $S_{2n-1}$ to be $w_{R2n-1}$, $w_{G2n-1}$, $w_{C2n-1}$, $w'_{B2n-2}$ and $w'_{R2n}$, respectively, the first achromatic color is represented. On the other hand, the second achromatic color is represented by setting the luminances of the red, yellow and blue subpixels $R_{2n}$, $Ye_{2n}$ and $B_{2n}$ included in the second subset $S_{2n}$ to be $w_{R2n}$, $w_{Ye2n}$ and $w_{B2n}$, respectively, as shown in FIG. 14B.

Now look at FIG. 13 again. As shown in FIG. 13, in the rendering section 500 of the multi-primary-color display device 100 of this preferred embodiment, the first achromatic color luminance adjusting section 530 determines not just the values $w_{R2n-1}$, $w_{G2n-1}$ and $w_{C2n-1}$ but also the values $w'_{B2n-2}$ and $w'_{R2n}$ as the values corresponding to the value $w_{2n-1}$ representing the achromatic color component of the color of the pixel $p_{2n-1}$ of the video signal. As a result, the achromatic color component of the color of the pixel $p_{2n-1}$ of the video signal is reflected on not only the subset $S_{2n-1}$ but also the blue and red subpixels $B_{2n-2}$ and $R_{2n}$ that are adjacent to the subset $S_{2n-1}$. On the other hand, the second achromatic color luminance adjusting section 540 determines the values $w_{R2n}$, $w_{Ye2n}$ and $w_{B2n}$ as the values corresponding to the value $w_{2n}$ representing the achromatic color component of the color of the pixel $p_{2n-1}$ of the video signal. As a result, the achromatic color component of the color of the pixel $p_{2n}$ of the video signal is reflected on only the subset $S_{2n}$.

In the multi-primary-color display device 100 of this preferred embodiment, the achromatic color component of the color of a pixel of video signal is reflected on not only its associated subset but also its adjacent subpixels as well. As a result, if an appropriate achromatic color cannot be represented even by adjusting the luminances of subpixels included in a single subset, other subpixels could be used to get the achromatic color represented with high luminance and minimize the luminance difference ratio or the chromaticity difference between the achromatic colors. It should be noted that the first and second achromatic color luminance adjusting sections 530 and 540 could operate just like the adjusting section 400 shown in FIG. 3.

Hereinafter, the advantages of the multi-primary-color display device 100 of this preferred embodiment over a multi-primary-color display device as Comparative Example 5 will be described. First of all, the multi-primary-color display device as Comparative Example 5 will be described. In each pixel of the multi-primary-color display device of Comparative Example 5, the subpixels are arranged as shown in FIG. 5. The multi-primary-color display device of Comparative Example 5 also represents an achromatic color using subpixels that are adjacent to the subset. In the following example, the achromatic color to be represented by the first subset and its adjacent subpixel will be referred to herein as a "first achromatic color" and the achromatic color to be represented by the second subset and its adjacent subpixel as a "second achromatic color", respectively.

The following Table 11 summarizes the maximum luminance Ys (%) of the first and second achromatic colors in the multi-primary-color display device of Comparative Example 5, the luminance ratio and the grayscale values of the respective subpixels, the sum of the respective maximum luminances Yp of the first and second achromatic colors, the difference $\varDelta$Ys (%) in luminance between the first and second achromatic colors, the chromaticity coordinates (x, y) of the first and second achromatic colors, and the difference $\varDelta$u'v' in chromaticity between the first and second achromatic colors.

TABLE 11

| | Comparative Example 5 | |
|---|---|---|
| | Achromatic colors | |
| | (C) (RGB) (R) | (B) (RYeC) (R) |
| Maximum luminance Ys (%) of 1$^{st}$ and 2$^{nd}$ achromatic colors | 3.06 (33.2) | 6.12 (66.5) |
| Luminance ratio | (0) (1, 1, 0.82) (0) | (0.13) (1, 1, 1) (0) |
| Grayscale values | (0) (255, 255, 255) (0) | (101) (255, 255, 255) (0) |
| Sum of maximum luminances Yp of 1$^{st}$ and 2$^{nd}$ achromatic colors | 9.18 | |
| Luminance difference $\varDelta$Ys (%) between 1$^{st}$ and 2$^{nd}$ achromatic colors | 3.07 (33.4) | |
| Chromaticity coordinates (x, y) | (0.2612, 0.2387) | (0.3555, 0.3580) |
| Chromaticity difference $\varDelta$u'v' | 0.089 | |

In the multi-primary-color display device of Comparative Example 5, the first achromatic color is represented by the red, green and blue subpixels R, G and B included in the first subset, the cyan subpixel C adjacent to the red subpixel of the first subset, and the red subpixel R adjacent to the blue subpixel of the first subset. In the same way, the second achromatic color is represented by the red, yellow and cyan subpixels R, Ye and C included in the second subset, the blue subpixel B adjacent to the red subpixel of the second subset, and the red subpixel R adjacent to the cyan subpixel of the second subset.

In the multi-primary-color display device of Comparative Example 5, the first achromatic color has chromaticity coordinates (0.2612, 0.2387), while the second achromatic color has chromaticity coordinates (0.3555, 0.3580). Also, in the multi-primary-color display device of Comparative Example 5, the blue subpixel has its luminance limited when the first achromatic color is represented and a portion of the limited luminance is used to represent the second achromatic color. In the multi-primary-color display device of Comparative Example 5, however, when an achromatic color is represented, no luminance corresponding to the luminance ratio of 0.05 of the blue subpixel is used.

In this manner, the multi-primary-color display device of Comparative Example 5 represents an achromatic color using an adjacent subpixel, and therefore, the maximum luminance Yp (=9.18) of the first and second achromatic colors shown in Table 11 is higher than the maximum luminance Yp (of 7.62) of the pixel of the multi-primary-color display device of Comparative Example 4 shown in Table 9. That is why the multi-primary-color display device of Comparative Example 5 can conduct a display operation with a higher luminance than the counterpart of Comparative Example 4. In the multi-primary-color display device of Comparative Example 5, the ratio of the luminance difference $\varDelta$Ys between the first and second achromatic colors is 33.4%, which is greater than that of the multi-primary-color display device of Comparative Example 4 shown in Table 9.

Next, the multi-primary-color display device 100 of this preferred embodiment will be described. In each pixel of the multi-primary-color display device 100, the subpixels are arranged as shown in FIG. 4. The following Table 12 also summarizes the maximum luminance Ys (%) of the first and second achromatic colors in the multi-primary-color display device 100, the luminance ratio and the grayscale values of the respective subpixels, the sum of the respective maximum luminances Yp of the first and second achromatic colors, the difference $\varDelta$Ys (%) in luminance between the first and second achromatic colors, the chromaticity coordinates (x, y) of the first and second achromatic colors, and the difference $\varDelta$u'v' in chromaticity between the first and second achromatic colors. The multi-primary-color display device 100 of this preferred embodiment reduces the ratio of the luminance difference $\varDelta$Ys and the chromaticity difference $\varDelta$u'v' between the first and second achromatic colors by using the luminance of the adjacent subpixels. In Table 12, the values of the multi-primary-color display device of Comparative Example 5 shown in Table 11 are also shown for reference.

TABLE 12

| | Comparative Example 5 | | This embodiment $1^{st}$ and $2^{nd}$ achromatic colors | |
|---|---|---|---|---|
| | (C) (RGB) (R) | (B) (RYeC) (R) | (B) (RGC) (R) | (C) (RYeB) (R) |
| Maximum luminance Ys (%) of $1^{st}$ and $2^{nd}$ achromatic colors | 3.06 (33.2) | 6.12 (66.5) | 4.60 (49.9) | 4.61 (50.1) |
| Luminance ratio | (0) (1, 1, 0.82) (0) | (0.13) (1, 1, 1) (0) | (0.17) (1, 1, 1) (0.65) | (0) (0.35, 1, 0.83) (0) |
| Grayscale values | (0) (255, 255, 255) (0) | (101) (255, 255, 255) (0) | (114) (255, 255, 255) (210) | (0) (159, 255, 235) (0) |
| Sum of maximum luminances Yp of $1^{st}$ and $2^{nd}$ achromatic colors | 9.18 | | 9.21 | |
| Luminance difference $\Delta$Ys (%) between $1^{st}$ and $2^{nd}$ achromatic colors | 3.07 (33.4) | | 0.01 (0.2) | |
| Chromaticity coordinates (x, y) | (0.2612, 0.2387) | (0.3555, 0.3580) | (0.3080, 0.3298) | (0.3213, 0.2871) |
| Chromaticity difference $\Delta$u'v' | 0.089 | | 0.04 | |

In the multi-primary-color display device 100 of this preferred embodiment, the first achromatic color is represented by the red, green and cyan subpixels R, G and C included in the first subset, the blue subpixel B adjacent to the red subpixel of the first subset, and the red subpixel R adjacent to the cyan subpixel of the first subset. In the same way, the second achromatic color is represented by the red, yellow and blue subpixels R, Ye and B included in the second subset, the cyan subpixel C adjacent to the red subpixel of the second subset, and the red subpixel R adjacent to the blue subpixel of the second subset.

Thus, the first subset 110 uses the luminance of the second subset 120 of its own pixel P and that of the second sub-set 120 of another pixel that is located opposite to the former second subset 120 with respect to the first subset 110. In the same way, the second subset 120 uses the luminance of the first subset 110 of its own pixel P and that of the first subset 110 of another pixel that is located opposite to the former first subset 110 with respect to the second subset 120. In this case, the green subpixel located at the center of the three subpixels included in the first subset 110 and the yellow subpixel located at the center of the three subpixels included in the second subset 120 have higher luminances than the other subpixels, and therefore, are not used for any other subset.

In the multi-primary-color display device 100 of this preferred embodiment, the first achromatic color has chromaticity coordinates (0.3080, 0.3298), while the second achromatic color has chromaticity coordinates (0.3213, 0.2871). In the maximum luminance Ys of the first achromatic color, the luminance of the first subset 110 is 4.04. On the other hand, the maximum luminance Ys of the second achromatic color is entirely the luminance of the second subset 120.

As described above, the multi-primary-color display device of Comparative Example 5 does not use any luminance corresponding to the luminance ratio of 0.05 of the blue subpixel to represent an achromatic color. On the other hand, the multi-primary-color display device 100 of this preferred embodiment uses the luminance of every subpixel to represent an achromatic color, and therefore, can increase the sum Yp of the luminances of the first and second achromatic colors. In the multi-primary-color display device 100 of this preferred embodiment, when a pixel represents an achromatic color, the luminances of the subpixels borrowed from its adjacent pixels are equal to those of the subpixels that the adjacent pixels use. That is why substantially six subpixels can be considered to be working as a unit to represent the two achromatic colors.

Comparing Table 12 to Table 8, it can be seen that the sum of the maximum luminances of the achromatic colors in the multi-primary-color display device 100 of this preferred embodiment is equal to the sum of the maximum luminances of pixels of the third preferred embodiment. Thus, in the multi-primary-color display device 100 of this preferred embodiment, the second achromatic color is represented with the luminances of the red, yellow and blue subpixels, which are included in the second subset, limited, and those luminances of the subpixels of the second sub-set that are limited when the second achromatic color are represented are used to represent the first achromatic color. More specifically, in the multi-primary-color display device 100 of this preferred embodiment, the upper limit of the luminances of the red and blue subpixels of the second subset 120 to represent the second achromatic color is defined to be lower than the luminance associated with the highest grayscale, and the red and blue subpixels of the second subset 120 that is adjacent to the first subset 110 are used along with the first subset 110 to represent the first achromatic color, thereby minimizing the luminance difference ratio and the chromaticity difference between the first and second achromatic colors.

Also, comparing Table 12 to Table 10, it can be seen that the sum Yp (=9.21) of the maximum luminances of the first and second achromatic colors in the multi-primary-color display device 100 is greater than the maximum luminance Yp (=8.09) of the pixel of the multi-primary-color display device of the fourth preferred embodiment shown in Table 10. As a result, the multi-primary-color display device 100 of this preferred embodiment can represent achromatic colors with high luminances.

Furthermore, by also using the adjacent subpixels, the multi-primary-color display device of Comparative Example 5 can represent achromatic colors with higher luminances than the counterpart of Comparative Example 4 as described above. However, the multi-primary-color display device of this preferred embodiment interchanges the cyan subpixel of the first subset and the blue subpixel of the second subset with each other, and therefore, can reduce the ratio of the luminance difference $\Delta$Ys between the achromatic colors more significantly than the counterpart of Comparative Example 5.

As described above, even if there are significant luminance difference ratio and chromaticity difference between subsets, the multi-primary-color display device 100 of this preferred embodiment conducts a display operation using adjacent subpixels, thereby reducing the luminance difference ratio and the chromaticity difference between the achromatic colors.

In the preferred embodiments described above, the subpixels of each pixel of the multi-primary-color display device 100 are arranged as shown in FIG. 4, i.e., in the order of red, green, cyan, red, yellow and blue subpixels. However, the present invention is in no way limited to those specific preferred embodiments. The subpixels may be arranged in any other order or pattern. Nevertheless, if the subpixels of the same pixel P are arranged in a row as shown in FIGS. 4 and 6, an arrangement that uses the luminances of subpixels belonging to adjacent subsets can be designed easily. Also, among the red, green and cyan subpixels included in the first subset, the green subpixel is preferably arranged at the center and the red and cyan subpixels are preferably arranged at both ends.

Also, in the preferred embodiment described above, only the second subset 120 represents the second achromatic color. However, the present invention is in no way limited to that specific preferred embodiment. The second achromatic color may also be represented by not only the second subset 120 but also its adjacent subpixels.

Furthermore, in the multi-primary-color display device of the fourth preferred embodiment described above, to change the hues of the first achromatic color associated with the first sub-set toward the red range, the luminances of the green and cyan subpixels should be decreased. On the other hand, the multi-primary-color display device 100 of this preferred embodiment can change the hues of the first achromatic color toward the red range by increasing the luminance of the adjacent red subpixel without changing the luminance of any subpixel belonging to the first subset. Consequently, the multi-primary-color display device of this preferred embodiment can represent achromatic colors with higher luminances than the counterpart of the fourth preferred embodiments described above.

Furthermore, in the preferred embodiments described above, the video signal preferably is in accordance with the progressive format. However, the present invention is in no way limited to those specific preferred embodiments. The video signal may also be in accordance with the interlaced format.

Furthermore, in the preferred embodiments described above, a given subset and subpixels that are adjacent to the given subset in the row direction are preferably used. However, the present invention is in no way limited to those specific preferred embodiments. The achromatic colors may also be represented using a given subset and subpixels that are adjacent to the given subset in the column direction.

Furthermore, in the preferred embodiments described above, the achromatic colors are preferably represented using adjacent subpixels. However, the present invention is in no way limited to those specific preferred embodiments. As already described for the fifth preferred embodiment, the luminances associated with the achromatic color components may be determined first just as described above, the luminances associated with chromatic color components may be determined next, and then respective subpixels of the multi-primary-color display device 200 may have their luminances defined by adding together these luminances. In this manner, the present invention is also applicable to even a situation where non-achromatic colors need to be represented.

It should be noted that the multi-primary-color converter 300, adjusting section 400 and rendering section 500 included in the multi-primary-color display device 100 according to the first through sixth preferred embodiments described above could be implemented as hardware components but could also be implemented by software programs either partially or even entirely. If those elements are implemented by software, a computer may be used as needed. In that case, the computer may include a CPU (central processing unit) for executing those various programs and a RAM (random access memory) functioning as a work area to execute those programs. And by having the programs that perform the functions of the respective elements executed by the computer, those elements are implemented by the computer itself, so to speak.

Also, those programs may be either installed into the computer by way of a storage medium or downloaded into the computer over a telecommunications network. In the former case, the storage medium may be either removable from the computer or built in the computer. More specifically, the storage medium could be loaded either into the computer so that the computer can read the recorded program code directly or into a program reader that is connected as an external storage device to the computer. Examples of preferred storage media include: tapes such as magnetic tapes and cassette tapes; various types of disks including magnetic disks such as flexible disks and hard disks, magneto-optical disks such as MOs and MDs, and optical discs such as CD-ROMs, DVDs, and CD-Rs; cards such as IC cards (including memory cards) and optical cards; and various types of semiconductor memories such as mask ROMs, EPROMs (erasable programmable read-only memories), EEPROMs (electrically erasable programmable read-only memories) and flash ROMs. Alternatively, if the program is downloaded over a telecommunications network, the program may be transmitted as a carrier wave or a data signal in which its program code is implemented as a type of electronic transmission.

Furthermore, in the foregoing description, although a liquid crystal display device has been described as a specific multi-primary-color display device, the present invention is in no way limited to those specific preferred embodiments. A multi-primary-color display device according to a preferred embodiment of the present invention could also be implemented as any other multi-primary-color display device that can conduct a display operation in multiple primary colors such as a cathode ray tube (CRT), a plasma display device, an organic EL (electroluminescence) display device, a field emission display (FED) including a surface-conduction electron-emitter display (SED), or a liquid crystal projector.

The entire disclosure of Japanese Patent Application No. 2007-15281, on which the present application claims priority, is hereby incorporated by reference.

The multi-primary-color display device according to a preferred embodiment of the present invention can be used effectively as a PC monitor, a TV monitor, a projector, or a cellphone display, for example.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A multi-primary-color display device comprising:
a plurality of pixels each including a first subset including red, green and cyan subpixels and a second subset including yellow and blue subpixels; wherein
in each of said plurality of pixels, the subpixels included in the first subset are arranged in series in one direction, and the subpixels included in the second subset are arranged in series in the same direction as the subpixels of the first subset; and
supposing achromatic colors to be represented by the first and second subsets are called a first achromatic color and a second achromatic color, respectively, a ratio of a difference in luminance between the first and second achromatic colors to a sum of maximum luminances of the first and second achromatic colors is equal to or smaller than about 15% and a difference $\Delta u'v'$ in chromaticity between the first and second achromatic colors is equal to or smaller than about 0.100.

2. The multi-primary-color display device of claim 1, wherein in each of said plurality of pixels, the subpixels of first and second subsets are arranged in line.

3. The multi-primary-color display device of claim 1, wherein in the first subset, the green subpixel is located between the red and cyan subpixels.

4. The multi-primary-color display device of claim 1, wherein the subpixels of the first and second subsets are arranged in line in an order of the red, green, cyan, yellow and blue subpixels.

5. The multi-primary-color display device of claim 1, wherein the second subset further includes another red subpixel that is different from the red subpixel of the first subset.

6. The multi-primary-color display device of claim 5, wherein in each of said pixels, each of the subpixels included in the first subset is arranged adjacent to its associated one of the subpixels included in the second subset.

7. The multi-primary-color display device of claim 5, wherein the another red subpixel of the second subset is adjacent to the red subpixel of the first subset.

8. The multi-primary-color display device of claim 5, wherein in each of said pixels, the subpixels included in the first subset are arranged in the order of the red, green and cyan subpixels, and the subpixels included in the second subset are arranged in the order of the another red, yellow and blue subpixels.

9. The multi-primary-color display device of claim 1, wherein the subpixels of at least one of the first and second subsets have luminances determined based on a value of a video signal representing the colors of two pixels.

10. The multi-primary-color display device of claim 1, comprising:
a multi-primary-color display panel including the pixels; and
a multi-primary-color converter arranged to convert values of a video signal representing luminances of red, green and blue into values representing the luminances of the primary colors of the subpixels included in the first and second subsets.

11. A multi-primary-color display device comprising:
a plurality of pixels each including a first subset including red, green and cyan subpixels and a second subset including yellow and blue subpixels; wherein
in each of said plurality of pixels, the subpixels included in the first subset are arranged in series in one direction, and the subpixels included in the second subset are arranged in series in the same direction as the subpixels of the first subset; and
the subpixels of the respective pixels are arranged in a matrix, and supposing an achromatic color to be represented by not only one of the first and second subsets but also subpixels that are adjacent to the one subset is called a first achromatic color and an achromatic color to be represented by the other subset is called a second achromatic color, a ratio of a difference in luminance between the first and second achromatic colors to a sum of the maximum luminances of the first and second achromatic colors is equal to or smaller than about 15% and a difference $\Delta u'v'$ in chromaticity between the first and second achromatic colors is equal to or smaller than about 0.100.

12. A multi-primary-color display device comprising:
a plurality of pixels each including a first subset including red, green and cyan subpixels and a second subset including yellow and blue subpixels; wherein
in each of said plurality of pixels, the subpixels included in the first subset are arranged in series in one direction, and the subpixels included in the second subset are arranged in series in the same direction as the subpixels of the first subset; and
the subpixels of the respective pixels are arranged in a matrix, and supposing an achromatic color to be represented by not only one of the first and second subsets but also subpixels that are adjacent to the one subset is called a first achromatic color and an achromatic color to be represented by not only the other subset but also subpixels that are adjacent to the other subset is called a second achromatic color, a ratio of a difference in luminance between the first and second achromatic colors to a sum of the maximum luminances of the first and second achromatic colors is equal to or smaller than about 15% and a difference $\Delta u'v'$ in chromaticity between the first and second achromatic colors is equal to or smaller than about 0.100.

13. A multi-primary-color display device comprising:
a plurality of pixels each including a first subset including red, green and cyan subpixels and a second subset including yellow and blue subpixels; wherein
in each of said plurality of pixels, the subpixels included in the first subset are arranged in series in one direction, and the subpixels included in the second subset are arranged in series in the same direction as the subpixels of the first subset; and
when one of the pixels represents an achromatic color, an upper limit of luminance of at least one of the subpixels included in the first and second subsets is defined to be lower than a luminance of each of the at least one of the subpixels corresponding to a highest grayscale.

* * * * *